US011134201B2

United States Patent
Xu et al.

(10) Patent No.: US 11,134,201 B2
(45) Date of Patent: Sep. 28, 2021

(54) VISION ASSISTED DRIVING SYSTEM USING A VERTICALLY EXTENDABLE CAMERA

(71) Applicant: INTERNATIONAL BUSINESS MACHINES CORPORATION, Armonk, NY (US)

(72) Inventors: Luna Xu, San Jose, CA (US); Jalal Mahmud, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/545,400

(22) Filed: Aug. 20, 2019

(65) Prior Publication Data
US 2021/0058555 A1 Feb. 25, 2021

(51) Int. Cl.
*H04N 5/232* (2006.01)
*B60R 11/04* (2006.01)
*B60W 30/095* (2012.01)
*G06K 9/00* (2006.01)

(52) U.S. Cl.
CPC ......... *H04N 5/23299* (2018.08); *B60R 11/04* (2013.01); *B60W 30/0953* (2013.01); *G06K 9/00805* (2013.01); *B60R 2300/102* (2013.01); *B60R 2300/8093* (2013.01)

(58) Field of Classification Search
CPC ............ H04N 5/23299; G06K 9/00805; B60R 11/04; B60R 2300/8093; B60R 2300/102; B60W 30/0953
See application file for complete search history.

(56) References Cited

U.S. PATENT DOCUMENTS

| 3,689,695 A | * | 9/1972 | Rosenfield | ................ B60R 1/00 348/148 |
| 4,645,320 A | * | 2/1987 | Muelling | ................ B60R 11/04 352/132 |
| 4,815,757 A | * | 3/1989 | Hamilton | ................ B60R 11/04 182/69.4 |

(Continued)

OTHER PUBLICATIONS

Huang et al., "Structure From Motion Technique for Scene Detection Using Autonomous Drone Navigation," in IEEE Transactions on Systems, Man, and Cybernetics: Systems, 2017 IEEE, p. 1-12.

(Continued)

*Primary Examiner* — Francis Geroleo
(74) *Attorney, Agent, or Firm* — John Noh

(57) ABSTRACT

A method, a device, a system, a computer program product, and a computer system drives a vehicle with vision assistance. The device includes an imager vertically extendable from a surface of a vehicle from a retracted position to an extended position. The imager is configured to capture images from a predetermined height above the vehicle while the imager is in the extended position. The images capture a field of view including a predetermined distance from the vehicle. The device includes a mount coupled to the imager and having an extendable length to position the imager in the retracted position and the extended position. The device includes a processor configured to process the images to determine a recommendation for driving the vehicle based on driving conditions present at the predetermined distance based on the images.

20 Claims, 9 Drawing Sheets

(56) References Cited

U.S. PATENT DOCUMENTS

| | | | | |
|---|---|---|---|---|
| 4,913,458 | A * | 4/1990 | Hamilton | B60R 11/04 212/304 |
| 6,163,250 | A | 12/2000 | Moskowitz | |
| 6,384,741 | B1 * | 5/2002 | O'Leary, Sr. | B60R 1/00 340/905 |
| 6,421,081 | B1 * | 7/2002 | Markus | B60R 1/00 340/436 |
| 6,484,456 | B1 * | 11/2002 | Featherstone | H01Q 1/08 362/249.09 |
| 6,582,105 | B1 * | 6/2003 | Christensen | B60Q 1/2657 340/12.5 |
| 7,031,829 | B2 | 4/2006 | Nisiyama | |
| 7,448,812 | B2 * | 11/2008 | Heibel | B60R 11/04 396/419 |
| 8,137,008 | B1 * | 3/2012 | Mallano | B60R 11/04 396/427 |
| 8,515,610 | B2 | 8/2013 | Sung et al. | |
| 9,405,173 | B1 | 8/2016 | Okunami | |
| 9,443,142 | B2 | 9/2016 | Reynolds, Jr. | |
| 9,721,468 | B2 | 8/2017 | Giesler et al. | |
| 9,843,734 | B2 | 12/2017 | DiMenichi | |
| 10,011,230 | B1 * | 7/2018 | Brown | H04N 5/23238 |
| 10,302,744 | B1 * | 5/2019 | Krishnan | G01S 17/04 |
| 10,377,321 | B2 * | 8/2019 | Yerdon | F16B 7/1454 |
| 10,488,493 | B2 * | 11/2019 | Nguyen | G01S 17/87 |
| 10,543,783 | B1 * | 1/2020 | Wang | B60R 11/04 |
| 2013/0253754 | A1 * | 9/2013 | Ferguson | G05D 1/0231 701/28 |
| 2014/0016922 | A1 * | 1/2014 | Greenthal | F16M 11/2014 396/419 |
| 2015/0142250 | A1 * | 5/2015 | Cavender-Bares | A01C 7/004 701/23 |
| 2016/0232423 | A1 * | 8/2016 | Zhong | B60S 1/0844 |
| 2018/0065242 | A1 * | 3/2018 | Tanaka | B60L 53/80 |
| 2019/0043327 | A1 | 2/2019 | Stent | |
| 2019/0289772 | A1 * | 9/2019 | Murphy | A01B 79/005 |
| 2019/0392232 | A1 * | 12/2019 | Ma | G01S 17/42 |
| 2020/0156559 | A1 * | 5/2020 | Shiratsuki | G03B 17/56 |

OTHER PUBLICATIONS

Maeda et al., "Road damage detection using deep neural networks with images captured through a smartphone," arXiy preprint arXiv:1801.09454, 2018, pp. 1-14.

Mell et al., "The NIST Definition of Cloud Computing", National Institute of Standards and Technology, Special Publication 800-145, Sep. 2011, pp. 1-7.

Most, "Visual Navigation of an Autonomous Drone", MS thesis. Institutt for datateknikk og informasjonsvitenskap, 2014, pp. 1-2.

Nguyen et al., "Learning framework for robust obstacle detection, recognition, and tracking," IEEE Transactions on Intelligent Transportation Systems, vol. 18, No. 6, 2017, pp. 1633-1646.

Nissan Motor Corporation, "Around View Monitor", https://www.nissan-global.com/EN/TECHNOLOGY/OVERVIEW/avm.html, printed Aug. 6, 2019, pp. 1-2.

Roberts et al. "Saliency Detection and Model-based Tracking: a Two Part Vision System for Small Robot Navigation in Forested Environment." Unmanned Systems Technology XIV. vol. 8387. International Society for Optics and Photonics, 2012, pp. 1-3.

* cited by examiner

RETRACTED POSITION
400

EXTENDED POSITION
500

VISION ASSISTED DRIVING SYSTEM USING A VERTICALLY EXTENDABLE CAMERA

BACKGROUND

The exemplary embodiments relate generally to vehicle driving systems, and more particularly to vision assisted vehicle driving systems using a vertically extendable camera.

A vehicle may be equipped with various technologies that aid the driver. For example, the vehicle may be equipped with a navigation system that selects routes based on an initial or current position and a destination or an end position. The navigation system for a vehicle relies on map data from satellite images, traffic conditions as judged by GPS-determined locations, speeds from a large number of users, etc. to calculate a route for a given destination according to predefined parameters (e.g., avoiding tolls, shortest route, fastest time, etc.). Through a user interface, the navigation system may show the route to the user. While driving, the navigation system may dynamically update a map showing a current position of the vehicle and the route to be followed.

In another example, the vehicle may be equipped with an autopilot system that automatically controls movements of the vehicle. The autopilot system may include cameras or other types of sensors (e.g., ultrasound sensors) that attach to a front, a rear, or sides of the vehicle to gather images and other sensory data. The autopilot system may utilize machine learning techniques to achieve automatic lane correction, distance control from nearby vehicles, etc. When the vehicle is equipped with both the navigation system and the autopilot system, the vehicle may be configured to fully drive the vehicle automatically to the destination.

U.S. Pat. No. 9,721,468 describes a navigation aid for a motor vehicle with autopilot. The autopilot is designed to automatically carry out longitudinal and lateral guidance of the motor vehicle during a piloted journey without assistance from a driver. The navigation system determines a route to a destination on the basis of navigation data for roads determined using traffic data and a predetermined activation condition for the autopilot. The navigation system may take the autopilot into account during route planning. The navigation system tests where in the traffic network an activation condition for the autopilot is satisfied, where the traffic flow has such a low driving speed that the motor vehicle can be driven by the autopilot. Accordingly, the autopilot is based on traffic data from which the navigation system determines a route and identifies sections where the autopilot may be engaged. Therefore, there is a determination of whether the autopilot is to be used, not how the autopilot is used based on sensory data.

U.S. Pat. No. 8,515,610 describes an automatic driving system including a reference driving information database (e.g., driving lines, driving speeds, lane change information, etc.) and a navigation apparatus for searching a driving route from a starting point to a destination by using a position value of a vehicle and generating driving route information. The automatic driving system further includes a vehicle controller for performing unmanned automatic driving along a determined driving line at a determined driving speed. The automatic driving system determines a driving route and divides the route into sections from which reference information is used in determining how the automatic driving system is to be used. Therefore, the manner in which the automatic driving system is used in an autopilot functionality is based on reference information, not through sensory data that is gathered.

It is evident that conventional approaches such as those described above are limited by the information that is obtained. A conventional GPS backed navigation system may provide a global best route with an overall view of the map. However, such systems leave a local optimization to the driver to micro-control using manual inputs (e.g., steering, speed selection, etc.). A conventional autopilot system attempts to mimic human driver behaviors by obtaining a driver's view with front cameras. The conventional autopilot system may be capable of determining real-time traffic conditions from the surroundings of the vehicle and utilize traffic conditions at an appropriate distance from the vehicle to determine upcoming decisions. However, the upcoming decisions may be limited by the visual information that is obtained, particularly when the front and transverse views of the cameras are blocked by obstacles such as other vehicles from viewing the appropriate distance. To provide a fuller view, the vehicle must change lanes or occupy a proper position for the cameras to be better oriented to analyze traffic conditions (e.g., traffic jams, accidents, etc.) and make decisions (e.g., overpassing, change of route, etc.). Back and side cameras may help the vision with additional angles. However, the cameras may still be blocked by nearby cars and a line of sight may be impeded from capturing farther images, particularly at the appropriate distance for subsequent decisions to be made. Even if the conventional GPS backed navigation system were to be integrated, the navigation system incorporates a delay and is not capable of updating the location of the vehicle and other vehicles on the same road in real time or within an acceptable time for local optimization to be performed effectively.

There have been other approaches used in performing autonomous control of a vehicle. For example, vision-based autonomous flight systems have been developed for drones that are able to collect images from different angles and distances by changing a flying height. However, these technologies are applied in drones for self-navigation where the vehicle is capable of maneuvering along three axes. In contrast, a ground vehicle is only capable of maneuvering along two axes. The conventional vision-based autonomous flight system also does not consider traffic in the air and certain other factors (e.g., arrival time), as these factors are essentially irrelevant to these systems.

Currently, conventional approaches do not provide micro-control on navigation or autopilot for vehicles using data indicative of real-time surroundings and traffic from an appropriate distance. As noted above, the cameras may be at fixed locations relative to the vehicle that limit a line of sight when an obstacle is present, thereby requiring that the vehicle itself move for a different angle to be achieved. If the vehicle were to move for the different angles, the vehicle is under a different set of conditions from which decisions are to be made. To provide a different angle from which images may be captured, there have been approaches that provide for different views of the vehicle. For example, in contrast to fixed cameras on a front, a rear, or sides of a vehicle that have a line of view extending away from these cameras and the vehicle, a conventional imaging system attached to the vehicle may be configured to provide a bird's eye or elevated view. The conventional imaging system may composite a virtual elevated view including the vehicle based on four separate cameras fixed on the vehicle and angled toward the ground (e.g. one camera affixed to the front of the vehicle capturing images in a front quadrant, two cameras each affixed to a side view mirror capturing images in side quadrants, and one camera affixed to the back of the vehicle capturing images in a back quadrant). The virtual elevated view may then be used to confirm a vehicle's position relative to any lines on the ground and adjacent objects to allow the driver to maneuver into a parking spot with more ease. Despite a virtual elevated view being generated, the conventional imaging system utilizes substantially similar cameras that are fixed on the vehicle at a front, a rear, or sides so that even when positioned at a different angle, obstacles may still block a line of sight, particularly to capture images at an appropriate distance.

In another example, a conventional imaging system may use a retractable camera that captures images of yet another angle of the vehicle. U.S. Pat. No. 9,843,734 describes a front or rear camera on a rotating arm where rotation of the camera is coupled to movement of the rotating arm such that when the rotating arm is against the front or rear of the car, the camera points away from the vehicle. When the arm is rotated away from the car along a line parallel to the ground or a longitudinal length of the vehicle, the camera rotates towards the car pointing to one of a left blinker, a right blinker, or a license plate. Thus, when the arm is parallel to the front or rear of the car, the camera is pointed outward for a line of sight extending away from the car. When the arm is perpendicular to the front or rear of the car, the camera is pointed inward for a line of sight extending toward the car. However, even if the camera were to remain at a fixed angle for a line of sight outward extending away from the car, the rotatable camera extends horizontally such that obstacles may still block the line of sight, particularly to capture images at an appropriate distance.

SUMMARY

The exemplary embodiments disclose a method, a device, a system, a computer program product, and a computer system for vision assisted vehicle driving. In one aspect of the exemplary embodiments, a driving assistance device comprises an imager vertically extendable from a surface of a vehicle from a retracted position to an extended position. The imager is configured to capture images from a predetermined height above the vehicle while the imager is in the extended position. The images capture a field of view including a predetermined distance from the vehicle. The driving assistance device comprises a mount coupled to the imager and having an extendable length to position the imager in the retracted position and the extended position. The driving assistance device comprises a processor configured to process the images to determine a recommendation for driving the vehicle based on driving conditions present at the predetermined distance based on the images.

In another aspect of the exemplary embodiments, the method comprises setting an extendable length of a mount. The method comprises receiving images from an imager vertically extendable from a surface of a vehicle from a retracted position to an extended position. The imager is coupled to the mount such that the mount is in the extended position while the mount is at the set extendable length. The images are captured from a predetermined height above the vehicle while the imager is in the extended position. The images capture a field of view including a predetermined distance from the vehicle. The method comprises processing the images and determining a recommendation for driving the vehicle based on driving conditions present at the predetermined distance based on the images.

In a preferred embodiment, the driving assistance device further comprises a control channel communicatively connecting the processor to a vehicle driving system of the vehicle, the vehicle driving system incorporating the recommendation to control a movement of the vehicle.

In a preferred embodiment, the processor is further configured to determine the predetermined height that the imager is to occupy based on the images.

In a preferred embodiment, the driving assistance device further comprises a motion sensor configured to determine overhead distance data associated with an overhead object that is one of presently over the vehicle or determined to be along a path of the vehicle, such that the processor is further configured to determine the predetermined height that the imager is to occupy based on the overhead distance data.

In a preferred embodiment, the motion sensor is further configured to determine motion data associated with an object approaching the vehicle such that the processor is further configured to determine an angular orientation that the imager is to occupy based on the motion data.

In a preferred embodiment, the driving assistance device further comprises an environment sensor configured to determine environmental conditions data in surroundings around the vehicle such that the processor is further configured to determine whether to one of extend or retract the imager to the extended position based on the environmental conditions data.

In a preferred embodiment, the driving assistance device further comprises a seal configured to seal the surface of the vehicle while the imager is in the retracted position and the extended position.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
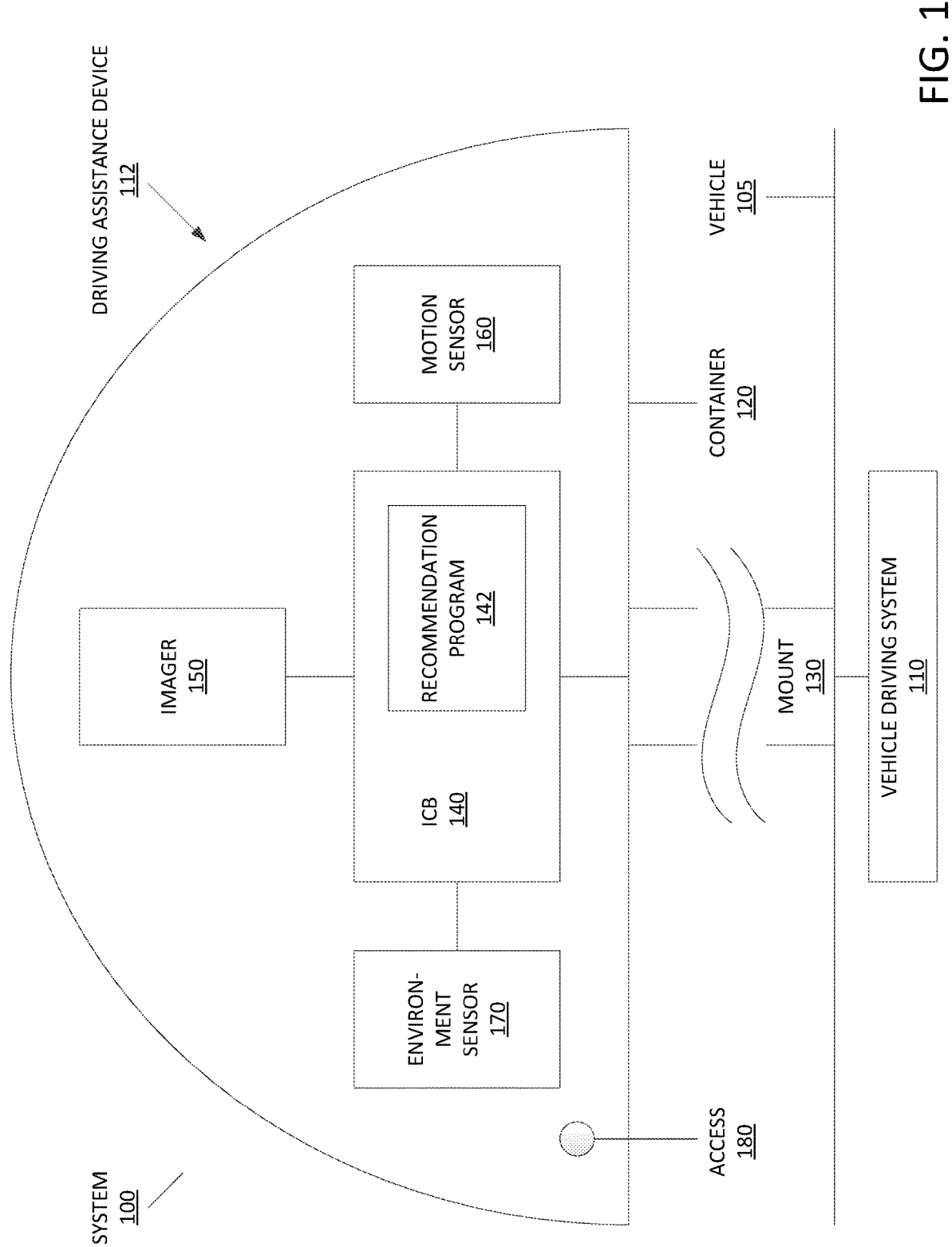
FIG. 1 depicts an exemplary schematic diagram of a driving assistance system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, a device, a system, a computer program product, and a computer system for an automated driving of a vehicle using vision assistance. As will be described in greater detail below, the exemplary embodiments are configured to incorporate a vertically extendable smart camera and sensor system that is attached on a top of a vehicle that is extendable to a plurality of heights to observe the surroundings of the vehicle while moving. The versatility of the smart camera may be configured to get a farther view of the road condition on a road on which the vehicle is traveling, particularly when a line of sight of the smart camera is obstructed by an obstacle. The exemplary embodiments may be configured to analyze the images that are captured by the smart camera to determine automatic adjustments to the height and angle of the smart camera. Accordingly, the exemplary embodiments may capture meaningful images that aid in determining instant micro-decisions (e.g., lane changing, having rests during long driving, rerouting, etc.) for automated and/or manual driving. When the vehicle is equipped with a navigation system, the exemplary embodiments may also utilize the meaningful images to aid the navigation system in planning routes with real-time traffic monitoring and prediction. The exemplary embodiments may further utilize the meaningful images capturing an appropriate or predetermined distance from the vehicle to aid an autopilot system to determine instant and/or near future decisions in a timely manner. Through positioning the smart camera and the sensor system at flexible orientations and positions, the exemplary embodiments may reduce a number of components (e.g., multiple camera and/or sensors positioned at a plurality of positions) that existing autopilot solutions require. Specifically, the exemplary embodiments may utilize a single smart camera and a sensor system incorporated into a unitary driving assistance device. As no other approaches or conventional designs do not utilize a vertically extendable smart camera that installs on top of the vehicle, the exemplary embodiments provide a configuration in which the vehicle may utilize information from images that view the surroundings at any angle and various heights to provide assistance for driving. Key benefits of the exemplary embodiments may include providing further positions from which the camera may capture images, particularly where the images capture an appropriate distance from the vehicle beyond obstacles within a vicinity of the vehicle that obstruct a line of sight of the camera, without requiring the vehicle to move to a different position. The benefits may also result in detecting possible collisions with greater accuracy to increase safety of utilizing autopilot systems. Detailed implementation of the exemplary embodiments follows.

The exemplary embodiments are described with regard to a vertically extendable smart camera installed on a top of a ground vehicle extending from the top of the vehicle to various heights. However, these features of the exemplary embodiments and the exemplary embodiments being directed to the ground vehicle are only illustrative. The exemplary embodiments may be modified such that the smart camera is positionable to capture images that provide substantially similar information as the implementation described herein and where the vehicle is not required to move for the camera to have various positions and orientations. For example, the exemplary embodiments may have the smart camera installed on a different non-top surface of the vehicle but still configured to capture images at various heights and establish a line of sight that is not obstructed. The exemplary embodiments may also be modified for use with non-ground vehicles (e.g., drones, planes, etc. not on the ground) so that the non-ground vehicle is not required to move yet still provide a plurality of different positions and orientations to capture images. For example, the exemplary embodiments may be modified for non-ground vehicles that are off the ground to position the smart camera at positive heights above the vehicle and negative heights below the vehicle.

FIG. 1 depicts an exemplary schematic diagram of a driving assistance system 100, in accordance with the exemplary embodiments. The driving assistance system 100 may be used to capture images at a plurality of heights relative to a vehicle on which the driving assistance system 100 is installed. According to the exemplary embodiments, the driving assistance system 100 may include a vehicle 105 including a vehicle driving system 110, a driving assistance device (DAD) 112 having a container 120 and including an integrated circuit board (ICB) 140, an imager 150, a motion sensor 160, and an environment sensor 170, and a mount 130 on which the DAD 112 is coupled to the vehicle 105. While programming and data of the exemplary embodiments may be stored and accessed modularly and/or remotely among the components of the DAD 112, programming and data of the exemplary embodiments may alternatively or additionally be stored locally on as few as one physical computing device or amongst other computing devices than those depicted.

In the exemplary embodiments, the vehicle 105 may be a vehicle capable of traveling along a road or surface. For example, the vehicle 105 may be a car, a truck, a bus, etc. that travels on roads. In another example, the vehicle 105 may be a boat traveling on water. For illustrative purposes, the exemplary embodiments will be described with regard to the vehicle 105 being a car traveling on a road where other vehicles may also be traveling. In addition to the components to be described herein, the vehicle 105 may include a plurality of different components that allow the vehicle 105 to be driven that those skilled in the art will readily understand.

In the exemplary embodiments, the vehicle driving system 110 may be one or more components that may be used to drive the vehicle 105. The vehicle driving system 110 may incorporate hardware, software, and/or firmware components that contribute to driving the vehicle 105. For example, the vehicle driving system 110 may include a navigation system. The vehicle 105 may include a display device in which information from the navigation system may be shown to a driver of the vehicle 105. The navigation system may receive inputs (e.g., a destination) and determine a route to be taken. The navigation system may generate a map that shows the route and a current position of the vehicle 105. The exemplary embodiments may utilize any navigation system as those skilled in the art will understand. The navigation system of the vehicle 105 may also incorporate outputs from the DAD 112 as will be described below. In another example, the vehicle driving system 110 may include an autopilot system. The autopilot system may be configured to automatically drive the vehicle 105 through micro-decisions for instant conditions (e.g., tracking, maintaining a position in a lane, maintaining a distance from other vehicles, etc.) and for near future decisions based on current conditions (e.g., lane changing, overpassing, etc.). Although the DAD 112 may provide sufficient information for the autopilot system, the autopilot system may also include further components that provide information to perform automated driving for the micro-decisions and near future decisions (e.g., imagers and/or other sensors fixed around the vehicle 105). Accordingly, the exemplary embodiments may utilize any autopilot system as those skilled in the art will understand. The autopilot system of the vehicle 105 may also incorporate outputs from the DAD 112 as will be described below. In a further example and according to the exemplary embodiments, the vehicle driving system 110 may include a central control logic. The central control logic may utilize a control channel to exchange data between the DAD 112 and the vehicle driving system 110. As will be described in detail below, the control channel may be established through a wired connection. The wired connection may also provide power to the DAD 112. However, in an alternative embodiment to be described below, the control channel may also be established through a wireless connection (e.g., a short range wireless connection such as Bluetooth). In a further alternative embodiment, the DAD 112 may be equipped with a portable power supply.

The DAD 112 may include the container 120 that encloses components of the DAD 112 (e.g., the ICB 140, the imager 150, the motion sensor 160, and the environment sensor 170). The container 120 may be a transparent cover that allows for components being held therein to have access outside the container 120. For example, the imager 150 may have a line of sight from within the container 120 to objects positioned outside the container 120. For aesthetic purposes, the container 120 may have a similar color with an exterior of the vehicle 105. In another example, the container 120 may be clear and the DAD 112 may include a cover (not shown) that opens for the container 120 to be raised. The cover may provide further protection of the DAD 112 and the components therein while closed over the container 120. The container 120 may be made of a variety of different materials. For example, the container 120 may be made of a strong glass, plastic, acrylic, etc. The container 120 may also be designed to be environment-proof so that conditions existing outside the container 120 do not affect the components being held within the container. For example, the container 120 may be water-proof such that precipitation events or other sources of liquid do not penetrate the container 120.

The ICB 140 may be a logic board on which processing components may be integrated. For example, the ICB 140 may be a black box for the DAD 112. The ICB 140 may include a processor, a plurality of chips associated with each of the further components of the DAD 112, a memory arrangement (e.g., RAM), a motherboard, etc. Executed on a processor, the ICB 140 may include a recommendation program 142. As will be described in detail below, the recommendation program 142 may receive outputs from the various components of the DAD 112 and exchange data with the vehicle driving system 110. The exemplary embodiments are described herein where the DAD 112 includes the ICB 140 within the container 120 as a specifically designed processing component for operations that are described below. However, the use of the ICB 140 is only exemplary. According to another exemplary embodiment, the DAD 112 may utilize a separate processing component configured with the recommendation program 142. For example, the vehicle driving system 110 may incorporate the recommendation program 142 separate from the DAD 112. The ICB 140 is described in greater detail as a hardware implementation with reference to FIG. 9.

The imager 150 may be any image capturing component configured to capture images of surroundings of the vehicle 105. According to the exemplary embodiments, the imager 150 may be a camera with a wide-angled lens. The camera may also be positioned in the container 120 to move. For example, the camera may rotate about 360 degrees in a horizontal manner (e.g., about a rotation axis extending perpendicular to the top plane of the vehicle 105). The wide-angled lens may allow the imager 150 to capture images that cover a wider area while the rotatability enables areas not included in the wider area to be captured. However, it should be noted that the imager 150 being a wide-angled lens camera that is horizontally rotatable is only exemplary. The DAD 112 according to the exemplary embodiments may utilize any type of imager 150 that is configured to capture images that are provided to the ICB 140 that may be fixed or movable in other manners. For example, the exemplary embodiments may utilize the imager 150 having any type of lens, a plurality of different features (e.g., pan, tilt, zoom), etc.

The motion sensor 160 may be configured to determine motions being experienced by the DAD 112 and the vehicle 105 as well as determine distances to overhead objects. The motion sensor 160 may include one or more components that are designed to determine motion and distance. For example, the motion sensor 160 may include a transmitter and a receiver that, respectively, transmits a signal (e.g., ultrasound, radiation, etc.) and receives a return signal (e.g., after bouncing off an object). Based on the transmission and reception of the signal, the motion sensor 160 may perform operations that determine the distance to an overhead object that may or will be overhead of the vehicle 105 and the DAD 112. In another example, the motion sensor 160 may be embodied as a laser detector that is configured to move 360 degrees in horizontal and vertical directions within the container to determine distances to overhead objects. As will be described in detail below, the motion sensor 160 may determine this distance for overhead objects to avoid raising the DAD 112 to a height that may cause a collision with overhead objects. In another example, the motion sensor 160 may include a component that detects when the vehicle 105 and/or the DAD 112 experiences motion. For example, the motion sensor 160 may include an accelerometer, a gyroscope, etc. As will be described in detail below, the motion sensor 160 may determine motion to detect when a drastic movement in the surroundings of the vehicle 105 is experienced on an opposite side of direction that the imager 150 is facing or outside a field of view of the imager 150. This drastic movement may be indicative of a possible collision that triggers the DAD 112 to adjust an angle of the imager 150 (e.g., to capture an area missed by the wide-angle lens).

The environment sensor 170 may include one or more sensors that detect various environmental conditions. For example, the environment sensor 170 may senses a weather condition (e.g., types of precipitation, a level of precipitation, lightning, thunder, other extreme weather conditions, etc.). In another example, the environment sensor 170 may be capable of detecting types of pressure (e.g., raindrops, air pressure, wind speed, etc.), a level of humidity, a temperature, environmental sounds, a radioactivity (e.g., thunder), and etc. associated with weather detection. The environment sensor 170 may be enclosed within the container 120. Thus, to access the conditions of the environment existing outside the container 120, the container 120 may include an access 180 (e.g., a hole) for the environment sensor 170 to sense the various environmental conditions. The environment sensor 170 may be at a fixed position within the container 120 at a predetermined location relative to the access 180. The environment sensor 170 may be configured with water-proof features to continue operations when select types of environmental conditions are present (e.g., light rain). As will be described in detail below, when other types of environmental conditions are detected (e.g., by the environment sensor 170, by the imager 150, through data received from a remote source, etc.), operations may be performed that modify how the DAD 112 is being used. For example, an environmental condition involving heavy rains may affect an image quality for images captured by the imager 150 that may result in incorrect decision-making. In another example, despite the features of the container 120 and/or the environment sensor 170 (e.g., water-proofing), an environmental condition involving thunderstorms, strong winds, extreme low or high temperatures, etc. may cause the DAD 112 to malfunction. Under these environmental conditions, operations may be performed to recommend that the DAD 112 terminate operations. As will be described below, when the DAD 112 is not operating, the DAD 112 may retract back to the vehicle 105. While retracted, the DAD 112 may perform subsequent operations if the vehicle 105 is still in operation to determine if the DAD 112 may resume operation.

The exemplary embodiments are described with regard to the DAD 112 including a plurality of sensors that generate respective sensory data. For example, the DAD 112 includes the imager 150 which is an imaging sensor that captures images, the motion sensor 160 which is a distance and motion sensor, and the environment sensor 170 which is a weather and environmental condition sensor. However, the use of these sensors is only exemplary. The exemplary embodiments may incorporate further sensors that provide further types of sensory data. Based on form factor considerations, energy usage, etc., the exemplary embodiments may include further sensors within the container 120 or in a modular manner (e.g., fixed to the vehicle 105). The further sensors may capture sensory data that is not captured by the imager 150, the motion sensor 160, and the environment sensor 170 and/or may at least partially capture redundant types of sensory data (e.g., to eliminate false positives with a higher confidence). In an exemplary implementation, the DAD 112 may further incorporate a sound sensor (e.g., to capture sounds in the environment surrounding the vehicle 105).

According to the exemplary embodiments, the DAD 112 may be vertically extendable from a top of the vehicle 105. The extendable feature of the DAD 112 may be performed via the mount 130. The mount 130 may extend from a base length corresponding to when the DAD 112 is in a retracted position to an extended length corresponding to when the DAD 112 is in an extended position. The mount 130 may be configured to extend to a maximum length. For example, the mount 130 may have a maximum length of three times a car height (e.g., 10 meters). Accordingly, a value of the maximum length may differ based on a type of the vehicle 105 on which the DAD 112 is installed. For example, a top of a sedan may have a relatively low height compared to a top of a SUV, a van, a semi-truck, etc. Accordingly, the maximum length of the mount 130 for the vehicle 105 having a lower height of the top may be greater than the maximum length of the mount 130 for the vehicle 105 having a higher height of the top. The extended length may be any length between the base length and the maximum length. The mount 130 may utilize any mechanism in which to extend the length. For example, the mount 130 may be configured with a telescopic design in which a plurality of segments nest within one another in the retracted position and the segments connect ends in the extended position (e.g., an upper end of a first segment remains in contact with a lower end of a second segment). Using the telescopic design, the DAD 112 and the mount 130 may occupy a lesser amount of space on the vehicle 105. In another example, the mount 130 may be a unitary component that is received into a recess in the vehicle 105 while in the retracted position. The recess may be oriented to have little to no effect on an interior of the vehicle where the driver and passengers may occupy space. In an exemplary implementation, the mount 130 may be made of various types of materials that exhibit a tensile strength that is capable of withstanding resistance that may be experienced while in the extended position (e.g., while extended to the maximum length). For example, the mount 130 may be made of plastic, metal, etc.

The DAD 112 or components of the DAD 112 may be configured to rotate. For example, as described above, the imager 150 may be configured to horizontally rotate within the container 120. According to this implementation, the container 120 and the other components of the DAD 112 (e.g., the ICB 140, the motion sensor 160, and the environment sensor 170) may remain in a fixed position while only the imager 150 rotates about a rotation axis. In another example, for the imager 150 to rotate while in a fixed position within the container 120, the container 120 may be configured to rotate about a rotation axis. According to this implementation, the container 120 may be rotatably coupled to the mount 130. In a further example, the container 120 may be fixedly coupled to the mount 130 and the imager 150 may also be in a fixed position in the container 120. For the imager 150 to rotate, the mount 130 may be rotatably coupled to the vehicle 105.

Figure 2:
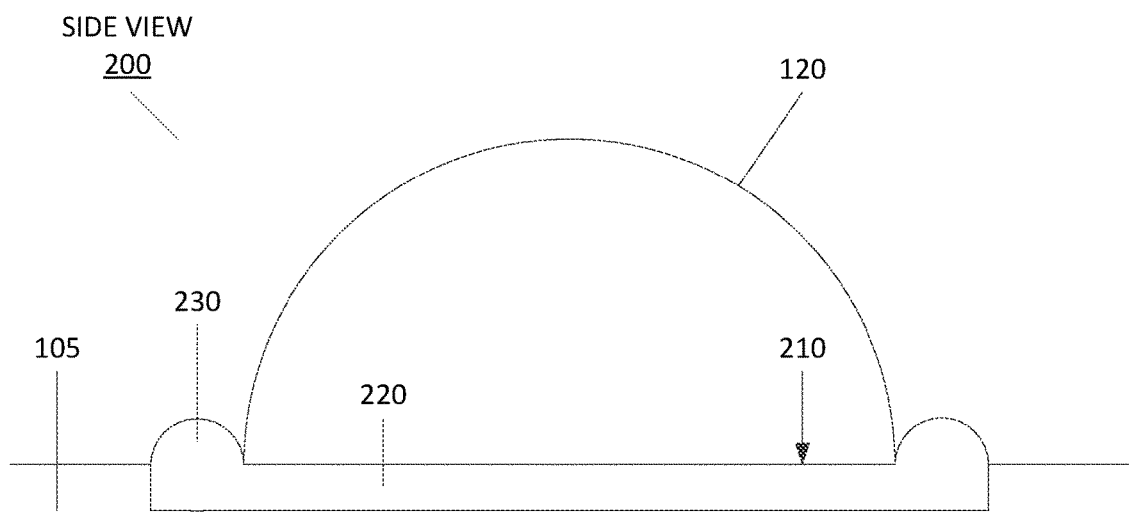
FIGS. 2 and 3 depict exemplary side views of the driving assistance system 100, in accordance with the exemplary embodiments.
Figure 3:
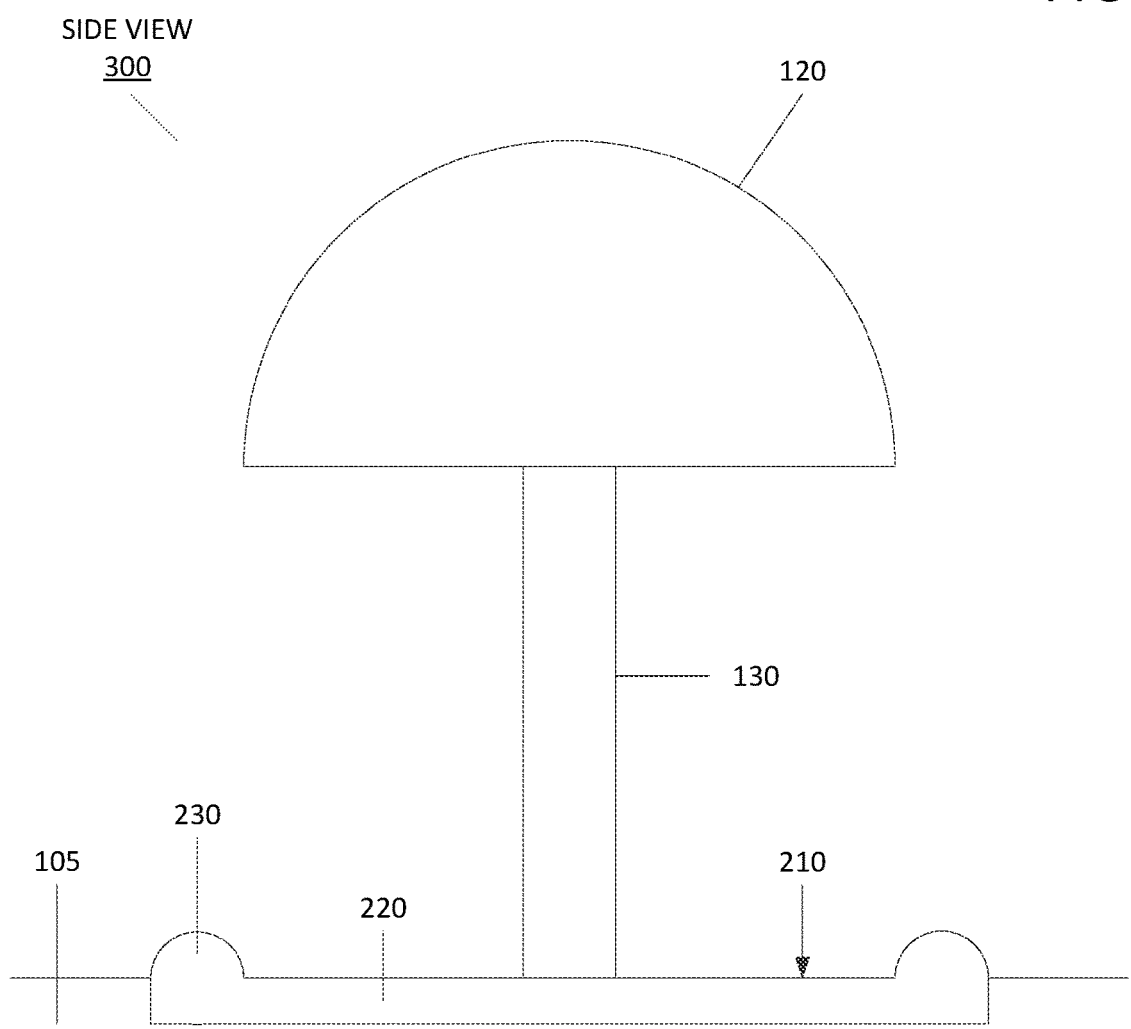
Figure 4:
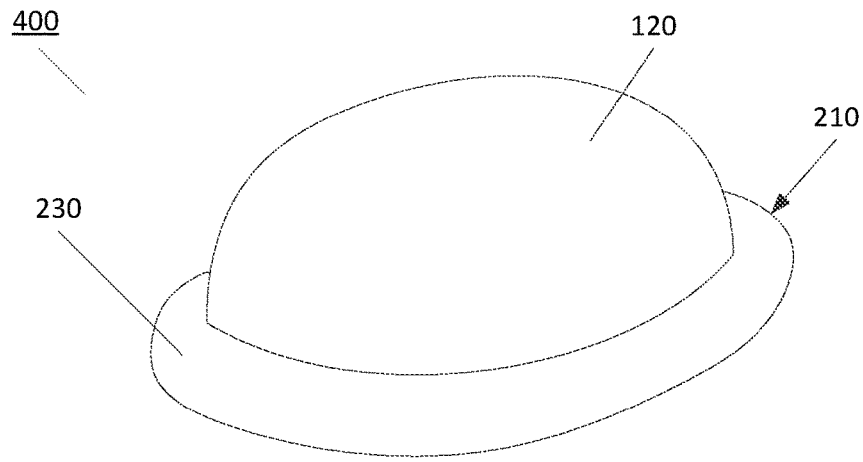
FIGS. 4 and 5 depict exemplary perspective views of the driving assistance system 100, in accordance with the exemplary embodiments.
Figure 5:
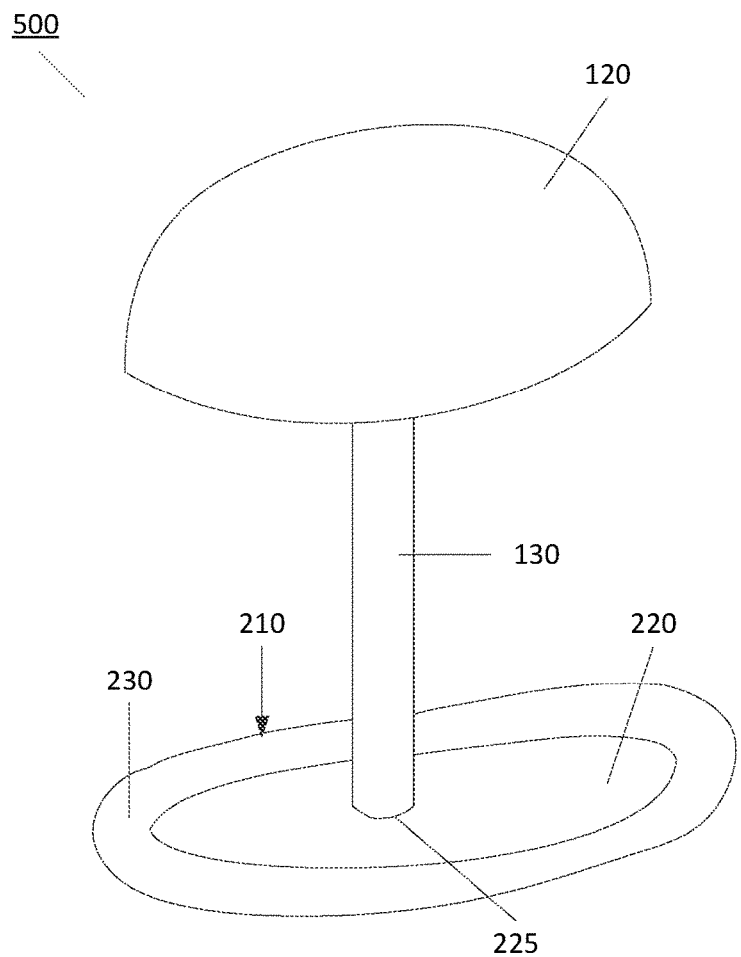

According to the exemplary embodiments, the DAD 112 may be extendable and the imager 150 may be rotatable (e.g., directly or indirectly) to capture images in a 360 degree field of view. As described above, the DAD 112 may be extendable between a retracted position and an extended position. FIGS. 2 and 3 depict exemplary side, cross-sectional views of the driving assistance system 100 while FIGS. 4 and 5 depict exemplary perspective views of the driving assistance system 100, in accordance with the exemplary embodiments. FIGS. 2 and 4 show the same retracted position where FIG. 2 illustrates a side, cross-sectional view 200 of the retracted position while FIG. 4 shows a perspective view 400 of the retracted position. FIGS. 3 and 5 show the same extended position where FIG. 3 illustrates a side, cross-sectional view 300 of the extended position while FIG. 5 shows a perspective view 500 of the extended position.

FIGS. 2-5 show a portion of a top of the vehicle 105 where the DAD 112 is installed. For example, for a car, the portion of the top of the vehicle 105 may be towards a front adjacent or a distance from a windshield. In another example, the portion of the top of the vehicle 105 may correspond to a point along a central longitudinal axis of the vehicle 105. In further examples, the DAD 112 may be positioned at any spot on an exterior top surface of the vehicle 105. As illustrated, the driving assistance system 100 may further include a seal 210 that provides a sealed seat for the container 120 while the DAD 112 is in the retracted position and provides a sealed surface for the vehicle 105 while the DAD 112 is in the extended position. The seal 210 may include a flat portion 220 and a raised, peripheral portion 230. The flat portion 220 may include a hole 225 that accommodates the mount 130. The seal 210 may have a substantially similar cross-sectional shape as a shape of the bottom surface of the container 120 and the hole 225 in the flat portion 220 may have a substantially similar shape as a cross-sectional shape of the mount 130. The inclusion of the raised portion 230 is only exemplary and in other exemplary embodiments, the seal 210 may include the flat portion 220 without the raised portion 230. The seal 210 may be constructed with any material that provides a sealing feature and/or water-proof feature. For example, the seal 210 may be made with rubber.

As illustrated in the side view 200 and the perspective view 400 of the retracted position, the container 120 may snugly fit in the seal 210 where a bottom, outer surface of the container 120 contacts the flat portion 220 and an outer periphery of the bottom, outer surface contacts the raised portion 230. While in the retracted position, the container 120 which is environment-proof and the raised portion 230 which is also environment-proof may prevent environmental conditions from penetrating an outer surface of the vehicle 105.

As illustrated in the side view 300 and the perspective view 500 of the extended position, the container 120 may be raised to a predetermined height based on a length that the mount 130 extends from the top of the vehicle 105. In the extended position, the bottom, outer surface of the container 120 and a top surface of the flat portion 220 may be exposed to the environment. However, as described above, the container 120 may be made with an environment-proof material. The flat portion 220 may also be made with an environment-proof material. The hole 225 in the flat portion 220 may be sized to snugly fit with the outer surface of the mount 130. While in the extended position, the snug fit between the mount 130 and the flat portion 220 may prevent environmental conditions from penetrating an outer surface of the vehicle 105.

In the exemplary embodiments, the recommendation program 142 may be in a cooperative relationship with the vehicle driving system 110 and may be a software, hardware, and/or firmware based application capable of exchanging data with the vehicle driving system 110 via a control channel (e.g., established through wires (not shown) connecting the ICB 140 to the vehicle driving system 110 with portions of the wires housed within the mount 130). The recommendation program 142 may perform further operations and utilize various wired and/or wireless connection protocols for data transmission and exchange with the components of the DAD 112 and the vehicle driving system 110, including wired connections, Bluetooth, 2.4 GHz and 5 GHz internet, near-field communication, Z-Wave, Zigbee, etc.

The recommendation program 142 may be involved in a plurality of sets of operations. As will be described below, the recommendation program 142 may perform operations used for activation and deactivation of the DAD 112, positioning of the imager 150, and processing images captured by the imager 150. The recommendation program 142 may perform these operations dynamically based on environmental and traffic conditions being experienced by the vehicle 105. The exemplary embodiments are described herein where the DAD 112 receives power from the vehicle 105 via the wires.

When the vehicle 105 is turned on, the DAD 112 may receive power from the battery of the vehicle 105. The DAD 112 that is installed on the top of the vehicle 105 may move away from the seal 210 as the mount 130 extends to an initial length. The components of the DAD 112 including the ICB 140, the imager 150, the motion sensor 160, and the environment sensor 170 may be activated. When the vehicle 105 is turned off, the DAD 112 may retract back towards the seal 210 as the mount 130 retracts to a base length. The DAD 112 may continue to receive power from the battery of the vehicle 105 until deactivation operations are completed. In the activation and deactivation operations based on whether the vehicle 105 is in use or not, the vehicle driving system 110 may provide a signal to the recommendation program 142 via the control channel.

The vehicle driving system 110 and the recommendation program 142 may exchange signals via the control channel. According to an exemplary embodiment, the signals that are exchanged may be performed through calls of an application programming interface (API). There may be a minimum number of control instructions that are transmitted from the vehicle driving system 110 to the recommendation program 142. For example, the control instructions from the vehicle driving system 110 may be embodied as signals that correspond to a vehicle power on (e.g., when the vehicle 105 has been turned on), a vehicle power off (e.g., when the vehicle 105 has been turned off), an emergency stop (e.g., when the vehicle 105 and/or driver is experiencing an emergency situation), a manual power on (e.g., when a manual input is entered to activate the DAD 112), a manual power off (e.g., when a manual input is entered to deactivate the DAD 112), and a stream setting (e.g., when a continuous stream of images are to be received by the vehicle driving system 110 from the imager 150). However, it is noted that the exemplary embodiments may utilize other signals from the vehicle driving system 110. Using the stream setting signal, the vehicle driving system 110 may explicitly request that the DAD 112 stream video from images captured by the imager 150 from a requested specification (e.g., angle, height, etc.). Such a setting may be convenient for certain scenarios such as when the vehicle 105 decides to change lanes or take a turn.

There may also be further instructions that are transmitted from the recommendation program 142 to the vehicle driving system 110. For example, the instructions from the recommendation program 142 may be embodied as signals that correspond to movements, actions, and recommendations as determined by the recommendation program 142 based on the conditions being experienced by the vehicle 105.

The API calls used by the vehicle driving system 110 and the recommendation program 142 may be designed based on the DAD 112 being smart (e.g., based on machine learning algorithms, based on artificial intelligence algorithms, etc.) and autonomous (e.g., self sufficient). Under this API design, the vehicle driving system 110 may signal the DAD 112 while the vehicle 105 is on and off, while the vehicle 105 is in an emergency state, when the DAD 112 is not supposed to operate, etc. The API design is configured to not interfere with the movement, decisions, or recommendations of the DAD 112.

With regard to the operations associated with positioning the DAD 112, as a result of the DAD 112 being activated (e.g., upon receiving a signal corresponding to the vehicle 105 turning on), the DAD 112 may occupy an initial position from the mount 130 extending to an initial length. As will be described below, the DAD 112 may occupy the initial position through a dynamic operation in which a length of the mount 130 is determined based on current conditions that are being experienced. The dynamic operation may also be configured to determine that the DAD 112 is to deactivate if warranted by the current conditions. There may be an API call in which the recommendation program 142 recommends that the DAD 112 is to be deactivated in light of environmental conditions. For example, the recommendation program 142 may advise or warn the vehicle driving system 110 that the DAD 112 is to be deactivated due to a combination of a weather condition and the speed of the car. Accordingly, the DAD 112 may be deactivated and retract in the vehicle 105. According to another exemplary embodiment, the initial position of the DAD 112 may be based on a predetermined initial length (e.g., a default length).

The initial length may be selected to be a value such that the DAD 112 is positioned where the imager 150 is capable of achieving a line of sight in front of the vehicle 105 at an appropriate distance from the vehicle 105 to make near future decisions. The initial length may also be selected based on a condition that there are no obstacles that obstruct the line of sight at the initial length of the mount 130. Based on information gathered via the imager 150, the motion sensor 160, and the environment sensor 170, the recommendation program 142 may calculate a value to be used for the initial length of the mount 130. For example, the recommendation program 142 may attempt to reach the initial length that avoids collisions based on information provided by the motion sensor 160. In a particular implementation, the initial height may be determined as a minimum value based on a height limit determined from information gathered by the motion sensor 160 and a safety boundary. The safety boundary may set a threshold indicative of terminating further raising of the DAD 112. For example, the safety boundary may be set to a predetermined distance to an overhead object relative to the vehicle 105 (e.g., 5 inches). Thus, according to an exemplary embodiment, the motion sensor 160 may detect a distance to the overhead object and the safety boundary may define a limit in which to raise the DAD 112 based on the distance to the overhead object.

The recommendation program 142 may also determine a reference length for the mount 130. The reference length may be a minimum length that the mount 130 is to be set for images to be captured at the appropriate distance (e.g., in front of the vehicle 105) for instant and/or near future decisions to be determined. The reference length may further be the minimum length when no obstacles obstruct a line of sight of the imager 150. When no overhead obstacles or obstacles for the imager 150 are present when the DAD 112 is activated, the initial length may correspond to the reference length.

While the DAD 112 is activated, the recommendation program 142 may continuously monitor the conditions being experienced by the vehicle 105 and the components of the DAD 112. Based on this monitoring, the recommendation program 142 may determine when a height of the DAD 112 (via the mount 130) is to be modified. The recommendation program 142 may recognize a plurality of conditions that trigger a height of the DAD 112 to be modified. For example, the line of sight of the imager 150 may be blocked by some obstacle or object (e.g., a truck, a vehicle with objects mounted on a roof rack, etc.). In this scenario, the recommendation program 142 may determine a length that the mount 130 is to be raised so that the height of the imager 150 is set for the imager 150 to regain a line of sight to the appropriate distance. The recommendation program 142 may determine the height to set the imager 150 based on images captured by the imager 150 while the line of sight is obstructed. During the continuous monitoring, if the recommendation program 142 determines that the obstacle is no longer present, the recommendation program 142 may set the length of the mount 130 to return to the reference length. In another example, the recommendation program 142 may determine that there is an incoming object should the vehicle 105 continue driving along a current route. The incoming object may be an overhead object such as a bridge, an overpass, a street sign, a tunnel, etc. The incoming object may not currently be detectable by the motion sensor 160 (e.g., the object is too far at a current moment) but the images captured by the imager 150 may capture the object in images. A sequence of images may indicate that the object is incoming. The recommendation program 142 may determine whether a current position of the DAD 112 may cause the DAD 112 to collide with the incoming object. The recommendation program 142 may therefore process the images and extract height information for the incoming object (e.g., an overpass may have height restriction information) or calculate an estimated height of the incoming. Based on the estimated height to be used by the DAD 112, the recommendation program 142 may cause the DAD 112 to retract from the mount 130 shortening to a minimum amount to prevent the DAD 112 from colliding with the incoming object. The recommendation program 142 may determine when the vehicle 105 is under the incoming object and when the incoming object no longer presents an obstacle. For example, the motion sensor 160 may determine when the incoming object is presently overhead. When the motion sensor 160 no longer detects the overhead object and/or the images captured with the wide-angles lens of the imager 150 show that the overhead object has been passed, the recommendation program 142 may set the length of the mount 130 to return to the reference length.

During the continuous monitoring while the DAD 112 is activated, the recommendation program 142 may consider any information output from the imager 150, the motion sensor 160, and/or the environment sensor 170. As described above, the imager 150 may capture images of surroundings of the vehicle 105. Based on the images, the recommendation program 142 may determine whether the imager 150 (e.g., through positioning of the DAD 112) is to be modified. The imager 150 may capture images of obstacles, incoming objects, environmental conditions, etc. that allow the recommendation program 142 to determine whether modifications to positioning the DAD 112 are needed and the types of modifications to be used (e.g., positioning, angular orientation, or a combination thereof).

During the continuous monitoring, the motion sensor 160 may provide information to the recommendation program 142. The recommendation program 142 may use the outputs of the motion sensor 160 to determine modifications to the positioning of the DAD 112 with regard to height and angular orientation. For example, the motion sensor 160 may determine distances to overhead objects. This process may be used from the initial length determination and throughout the continuous monitoring. The recommendation program 142 may use the distances to overhead objects to determine modifications to the height of the DAD 112 based on corresponding lengths of the mount 130. In another example, the motion sensor 160 may determine motion being experienced by the vehicle 105 and/or the DAD 112. The recommendation program 142 may use the motion data to determine modifications to the angle of the imager 150. For example, when a drastic movement of the surroundings of the vehicle 105 is experienced on an opposite side of direction that the imager 150 is facing, the recommendation program 142 may determine that the imager 150 is to rotate to a minimum amount to capture images of an area that has been missed.

During the continuous monitoring, the environment sensor 170 may provide information to the recommendation program 142. As described above, the recommendation program 142 may use outputs of the environment sensor 170 to determine whether the DAD 112 is to be used while the vehicle 105 is driven based on the conditions being experienced. When the conditions include extreme weather conditions, other conditions that prevent safe and/or efficient use of the DAD 112, a contributing condition that exacerbates other conditions that combine and create an unacceptable condition (e.g., as based on an acceptable threshold), etc., the recommendation program 142 may advise or warn the vehicle driving system 110 of the conditions being experienced for the DAD 112 to be partially deactivated. For example, the recommendation program 142 may advise that the vehicle 105 should travel to the nearest shelter or rest area along with travel information (e.g., route, distance, time to distance, etc.), slow down the vehicle 105, preserve images captured within a predetermined duration of time preceding a current time (e.g., in case the vehicle 105 gets into an accident due to the weather), etc. When the DAD 112 is in a partially deactivated status, the DAD 112 may fully retract back to the vehicle 105 to prevent damage to the DAD 112 from the environmental conditions (e.g., high winds that exceed an acceptable tensile force on the mount 130 while extended). Although in the retracted position, the DAD 112 may still maintain select operations while the vehicle 105 is running. For example, the DAD 112 may operate in a low-energy mode. In the low-energy mode, the imager 150 and the motion sensor 160 may be deactivated. In a further example, in the low-energy mode, the environment sensor 170 may additionally be deactivated. The ICB 140 may remain activated for processing of sensory data. For example, when the imager 150 and the motion sensor 160 are deactivated while the environment sensor remains activated, the environment sensor 170 may continue to monitor environmental conditions. In another example, when the imager 150, the motion sensor 160, and the environment sensor 170 are deactivated, the DAD 112 may include a sound sensor that captures sounds in the environment to detect whether there is a change in status of the environmental conditions (e.g., rain has stopped or reduced in severity). If the sound sensor detects low environmental noise, the DAD 112 may activate the imager 150 or one of the other sensors to provide respective sensory data to confirm the determination that there has been a change in status of the environmental conditions. When the recommendation program 142 has determined that the environmental conditions allow usage of the DAD 112, the recommendation program 142 may instruct or recommend resuming use of the DAD 112.

When the DAD 112 is activated, the recommendation program 142 may continuously monitor the environmental conditions including obstacles to dynamically set a height of the DAD 112 via control of the length of the mount 130. The recommendation program 142 may also be configured to process images captured by the imager 150 to determine instant and/or near future decisions with regard to driving the vehicle 105. The recommendation program 142 may perform real-time analysis on images streamed by the imager 150. The recommendation program 142 may process the images to determine recommendations to be provided to the vehicle driving system 110 that may be packaged to be provided to a human driver, output on a navigation system, used by an autopilot system that automatically drives the vehicle 105, etc. For illustrative purposes, the description regarding the image processing may assume that the recommendation program 142 is controlling a positioning of the DAD 112 such that the DAD 112 is properly positioned for the imager 150 to capture meaningful images (e.g., images that avoid obstacles that obstruct a line of sight towards an appropriate distance for instant and near future decisions). For example, the imager 150 may generally set a field of view with a central portion pointing toward a front area of the vehicle 105 at a height for images to be captured at the appropriate distance. The wide-angled lens may allow for a relatively large area to be captured (e.g., a front view, partial left and right views) which may allow for less frequent angular changes to get full images in a 360 degree field of view. The angular changes of the imager 150 may be caused by various factors such as a detecting an unusual or indecipherable object in the surroundings, a need for a clearer image of an object captured by the imager 150 at a different angular orientation, a drastic change in an object in the surroundings of the vehicle 105, etc.

The image processing aspect of the recommendation program 142 may be configured to detect a plurality of different types of events that is occurring or will occur in the surroundings of the vehicle 105. For example, the recommendation program 142 may detect events that indicate a possible collision, extract information from traffic signs (e.g., speed limit, slow warnings, etc.) captured in the images, detect blocking objects to adjust heights, detect upcoming traffic jams, detect traffic accidents that may be nearby that directly (e.g., traffic being redirected to another path or into lesser lanes) or indirectly (e.g., a backup from rubbernecking) cause a condition that may be experienced by the vehicle 105, detect weather conditions, etc. Based on detecting one or more of these events, the recommendation program 142 may determine an appropriate course of action from usage of the DAD 112 to driving the vehicle 105. In another operation or in another exemplary implementation, the recommendation program 142 may transmit the images to the vehicle driving system 110 that processes the images to determine the appropriate course of action. When transmitting the images, the recommendation program 142 may provide corresponding information for each image (e.g., timestamps, a type of event, a recommendation for a course of action, etc.). To provide an efficient approach for the vehicle driving system 110 to process the images, the recommendation program 142 may select images that may only provide redundant information, provide unclear information, provide unnecessary information, etc. and omit these select images from being transmitted to the vehicle driving system 110 (e.g., to prevent saturating a memory and storage capacity of the vehicle driving system 110).

According to the implementation where the API calls for signals transmitted from the vehicle driving system 110 to the DAD 112 being minimal, the recommendation program 142 may be configured to transmit the images to the vehicle driving system 110 for the vehicle driving system 110 to perform image processing to determine an appropriate course of action. In this implementation, the vehicle driving system 110 may also incorporate other available information that may be determined by various components or sensors of the vehicle 105. For example, the vehicle 105 may include a speedometer that tracks a current speed of the vehicle 105. In another example, the vehicle 105 may include an engine heat sensor that indicates a relative heated state of the engine. Based on this further sensory data that the DAD 112 may not have access, the vehicle driving system 110 may make a more informed determination for the appropriate course of action.

The recommendation program 142 may be configured to determine a plurality of different recommendations for courses of action to take based on the sensory data that has been received. The recommendations may include how the DAD 112 is to be used, how the vehicle 105 is to be driven (e.g., in an automated manner or through displaying recommendations to a human driver), etc. With regard to how the DAD 112 is to be used, the recommendation program 142 may determine environmental conditions and whether these environmental conditions allow for proper use of the DAD 112 so that image processing may be performed high a relatively high degree of confidence. The recommendation program 142 may also determine a positioning of the DAD 112.

With regard to how the vehicle 105 is to be driven, given an event detected through image processing, the recommendation program 142 may recommend a plurality of different courses of actions. For example, based on a type of the event that is detected, the recommendation program 142 may recommend the vehicle 105 to slow down (e.g., upcoming traffic backup), speed up (e.g., upcoming increase in speed limit), change lanes (e.g., an adjacent lane has less traffic or an increased pace), change a route (e.g., the current road is jammed for an extended period), go to nearest rest area and stop driving (e.g., the environmental conditions are not conducive to safe travel), etc.

In determining recommendations for courses of action, the recommendation program 142 may consider a plurality of optimization goals. For example, the recommendation program 142 may be configured with an optimization goal of reaching a destination in a least amount of time. In addition to the examples listed above, the recommendation program 142 may recommend overpassing another vehicle driving in front of the vehicle 105, use another lane having currently and likely faster traffic flow, change route from detecting a near future traffic jam due to an accident, a busy flow, etc., avoiding a singular vehicle traveling in a path of the vehicle 105, etc. In another example of an optimization goal, the recommendation program 142 may be configured with safety considerations. Thus, the recommendation program 142 may generate recommendations that slow down or speed up the vehicle 105 for safety reasons, modify driving actions (e.g., change lanes when no other vehicles are beside the vehicle 105, slow down when no cars are within tailgating distance, etc.) to avoid potential collisions with other vehicles or objects (e.g., tree limbs falling, animals crossing, inanimate objects suddenly in a path, etc.), etc. The recommendation program 142 may consider each of the optimization goals individually, in a combination, or holistically to generate the recommendations.

Although the DAD 112 and the recommendation program 142 are designed for the vehicle 105 and the driver and/or passengers riding the vehicle 105, the DAD 112 may also be configured for public safety considerations. For example, if the recommendation program 142 identifies another vehicle posing a hazardous condition (e.g., excessive speeding, weaving, etc.), the recommendation program 142 may continue capturing images of the hazardous vehicle to maintain a record should a collision occur (e.g., particularly with the vehicle 105). The record may be appended to any accident report, for litigious purposes, insurance purposes, criminal purposes, etc.

As described above, there may be a plurality of API calls that may be exchanged between the vehicle driving system 110 and the recommendation program 142. Among the different types of API calls, select ones may serve as interrupts. Once an interrupt occurs, the recommendation program 142 may aborts any further activities that are being performed (e.g., monitoring the surroundings of the vehicle 105) and give a highest priority to handle the interrupt. According to an exemplary embodiment, there may be a plurality of interrupt API calls that result in the aborting of the activities: an emergency stop, a stop service, and a stream video request.

When an API call for an emergency stop is received by the recommendation program 142, the recommendation program 142 may instruct the imager 150 to videotape (e.g., capture a consecutive number of images) the surroundings of the vehicle 105 and store the video as a record for further reference. The recommendation program 142 may also determine a recommendation for a nearest emergency lane, a shoulder, a rest area, etc. and retract the DAD 112 until a next vehicle start. When an API call for a stop service is received by the recommendation program 142, a driver or passenger may have provided a manual input that terminates use of the DAD 112. Accordingly, the recommendation program 142 may instruct that the DAD 112 be retracted back to the vehicle 105 in the retracted position and subsequently deactivate the DAD 112. When an API call for a stream video request is received by the recommendation program 142, a driver or passenger may have provided a manual input for such a request. When equipped with an autopilot system, the vehicle driving system 110 may also be configured to submit a stream video request. The stream video request may be submitted for a variety of reasons. For example, an autopilot system of the vehicle 105 may want to change lanes. Therefore, the autopilot system may require a view of various angles around the car to safely and properly change lanes (e.g., view if there is another vehicle in areas around the vehicle 105 not captured in the images by the imager 150). In another example, a human driver may be manually driving the vehicle 105 and provides an input for a turn to change lanes (e.g., a directional blinker is activated). The driving vehicle system 110 may transmit the stream video request such that the recommendation program 142 provides a streaming video, particularly for blind spots that the human driver would need to reorient his or her body to view. In a further example, the autopilot system and/or the human driver may be backing the vehicle 105. An elevated position provided by the DAD 112 being raised may provide a vantage point for the streaming video to be provided that shows obstacles that lie behind the vehicle 105 as well as potential incoming obstacles that may enter from different directions. To accommodate the stream video request, the recommendation program 142 may adjust the imager 150 to a requested angle and height, initiate the control channel, and stream the video from the imager 150 through the control channel.

The exemplary embodiment described above relates to an implementation in which the DAD 112 is designed as a unitary device that cooperatively operates with the vehicle driving system 110. The DAD 112 may operate autonomously with processing performed by the ICB 140 in a local manner. However, the unitary device and the local processing are only exemplary. In another exemplary embodiment, the DAD 112 may be designed in a modular manner in which select components of the DAD 112 may be remote from the confines of the container 120. For example, the imager 150 and the motion sensor 160 may provide more relevant information when incorporated in the container 120 of the DAD 112. However, because the environment sensor 170 senses environmental conditions in a general manner, the environment sensor 170 may be positioned remotely from the container 120 within certain limitations (e.g., fixed on the vehicle 105). In a further exemplary embodiment, the recommendation program 142 may perform general operations (e.g., selecting images for subsequent processing, packaging sensory data for subsequent processing, associating information with other data such as timestamps of when sensory data is generated, etc.). The more complex processing operations (e.g., image processing, generating recommendations, etc.) may be performed at a remote location. As described above, in one implementation, the vehicle driving system 110 may incorporate the more complex processing operations. In a further implementation, as described in further detail below, the exemplary embodiments may utilize a network configuration with a centralized server that provides the more complex processing operations. However, in view of real or near real-time aspects of the exemplary embodiments (e.g., for instant decisions, for near future decisions, etc.), any data exchange and associated operations may utilize processing rates and data rates that are sufficient for purposes of the exemplary embodiments.

Figure 6:
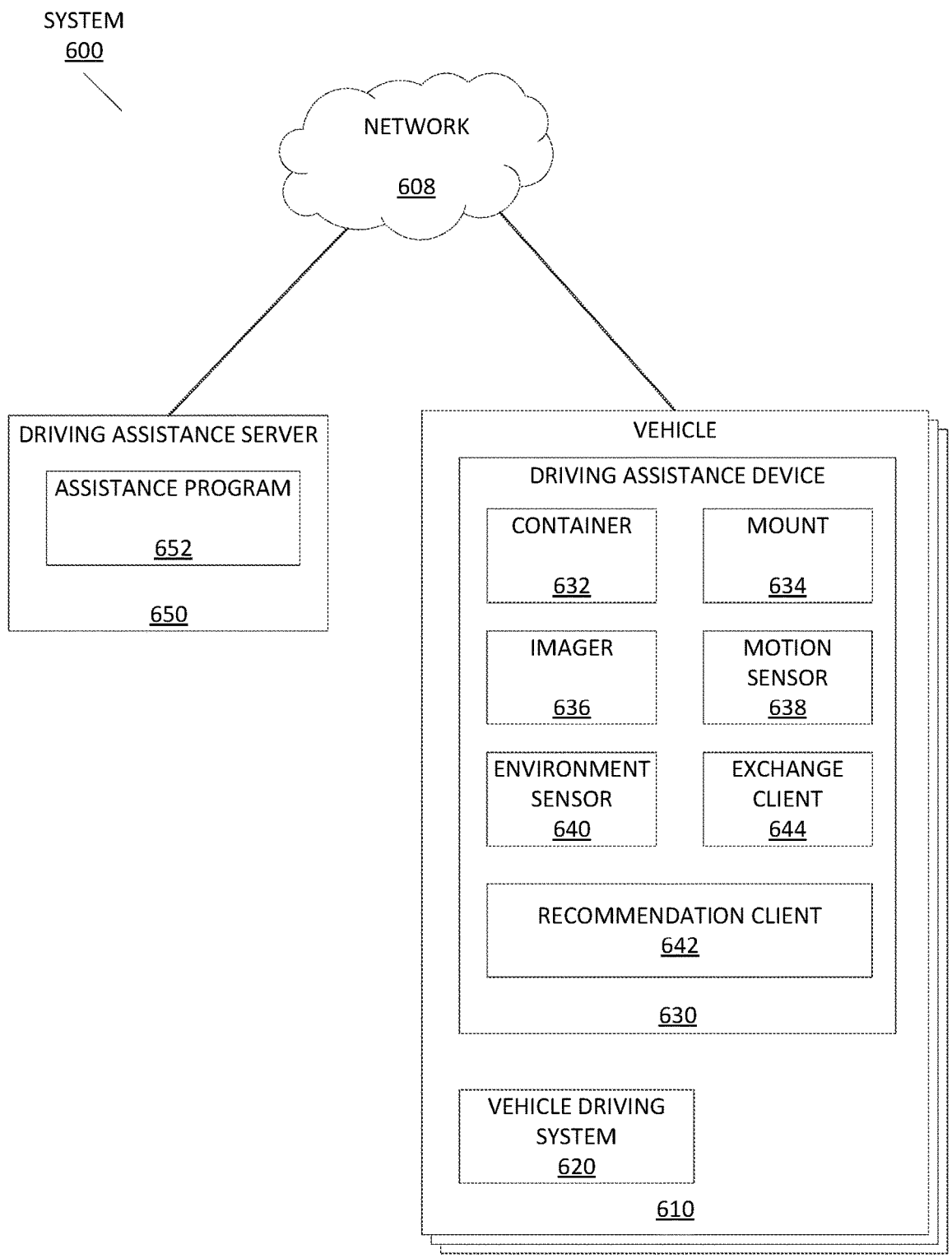
FIG. 6 depicts a further exemplary schematic diagram of a driving assistance system 600, in accordance with the exemplary embodiments.

FIG. 6 depicts a further exemplary schematic diagram of a driving assistance system 600, in accordance with the exemplary embodiments. The driving assistance system 600 may be used to capture images at a plurality of heights relative to a vehicle on which the driving assistance system 100 is installed. According to the exemplary embodiments, the driving assistance system 100 may include a vehicle 610 including a vehicle driving system 620 and a driving assistance device (DAD) 630 that includes a container 632, a mount 634, an imager 636, a motion sensor 638, an environment sensor 649, an exchange client 644, and a recommendation client 642, and a driving assistance server 650 which may all be interconnected via a network 608. While programming and data of the exemplary embodiments may be stored and accessed remotely across several servers via the network 608, programming and data of the exemplary embodiments may alternatively or additionally be stored locally on as few as one physical computing device or amongst other computing devices than those depicted.

In the interest of not being overly repetitious, select descriptions for components of the driving assistance system 600 that coincide substantially or identically with corresponding components of the driving assistance system 100 will be omitted. When components of the driving assistance system 600 differ from the counterpart components of the driving assistance system 100, such differences will be described below. Accordingly, the container 632, the mount 634, the imager 636, the motion sensor 638, and the environment sensor 640 may be substantially identical to the counterpart components of the container 120, the mount 130, the imager 150, the motion sensor 160, and the environment sensor 170. The vehicle driving system 620 may be substantially similar to the vehicle driving system 110. However, the vehicle driving system 620 may utilize different communication pathways in view of the network configuration.

In the exemplary embodiments, the network 608 may include a communication channel capable of transferring data between connected devices. Accordingly, the components of the driving assistance system 600 may represent network components or network devices interconnected via the network 608. In the exemplary embodiments, the network 608 may be the Internet, representing a worldwide collection of networks and gateways to support communications between devices connected to the Internet. Moreover, the network 608 may utilize various types of connections such as wired, wireless, fiber optic, etc. which may be implemented as an intranet network, a local area network (LAN), a wide area network (WAN), or a combination thereof. In further embodiments, the network 608 may be a Bluetooth network, a WiFi network, or a combination thereof. In yet further embodiments, the network 608 may be a telecommunications network used to facilitate telephone calls between two or more parties comprising a landline network, a wireless network, a closed network, a satellite network, or a combination thereof. In general, the network 608 may represent any combination of connections and protocols that will support communications between connected devices. For example, the network 608 may also represent direct or indirect wired or wireless connections between the components of the driving assistance system 600 that do not utilize the network 608.

In the exemplary embodiments, the DAD 630 may include a recommendation client 642 and an exchange client 644 and may be a device installed on a top of the vehicle 610. The DAD 630 110 may be associated with the vehicle 610. While the DAD 630 is shown as a single device enclosed within the container 632, in other embodiments, the DAD 630 may be comprised of a cluster or plurality of computing devices, in a modular manner, etc., working together or working independently. The DAD 630 is described in greater detail as a hardware implementation with reference to FIG. 9, as part of a cloud implementation with reference to FIG. 10, and/or as utilizing functional abstraction layers for processing with reference to FIG. 11. The exchange client 644 will be described in further detail below.

In the exemplary embodiments, the recommendation client 642 may act as a client in a client-server relationship and may be a software, hardware, and/or firmware based application capable of collecting outputs from the imager 636, the motion sensor 638, and the environment sensor 640 and package the sensory data for delivery to the driving assistance server 650 via the network 108. The recommendation client 642 may also be configured to select portions among the sensory data that is collected to be delivered to the driving assistance server 650 (e.g., to prevent overloading the driving assistance server 650 with superfluous data). The recommendation client 642 may perform further operations and utilize various wired and/or wireless connection protocols for data transmission and exchange associated with sensory data delivery, including wired connections (e.g., when the DAD 630 utilizes wired channels among the sensors and a hardware processing component including the recommendation client 642) and wireless connections such as WiFi, cellular, Bluetooth, 2.4 GHz and 5 GHz internet, near-field communication, Z-Wave, Zigbee, etc. (e.g., when the DAD 630 utilizes modular components that are separate from one another without physical connections, to establish a connection with the driving assistance server 650, etc.).

In the exemplary embodiments, the driving assistance server 650 may include an assistance program 652 and act as a server in a client-server relationship with the recommendation client 642 and the exchange client 644. The driving assistance server 650 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the driving assistance server 650 is shown as a single device, in other embodiments, the driving assistance server 650 may be comprised of a cluster or plurality of computing devices, working together or working independently. The driving assistance server 650 is described in greater detail as a hardware implementation with reference to FIG. 9, as part of a cloud implementation with reference to FIG. 10, and/or as utilizing functional abstraction layers for processing with reference to FIG. 11.

The exemplary embodiments may utilize a single centralized or multi-zoned approach in using the driving assistance server 650 or a plurality of driving assistance servers 650, respectively, through the network implementation. For example, the driving assistance server 650 may be responsible for monitoring a plurality of vehicles including the vehicle 610 that may be located in a predetermined geographic area (e.g., a block, a town, a city, a state, a province, a country, etc.). In another example, the driving assistance system 600 may include a plurality of driving assistance servers 650 each respectively assigned to monitor vehicles while in an associated portion of an overall geographic area.

In the exemplary embodiments, the assistance program 652 may be a software, hardware, and/or firmware application configured to receive sensory data from the recommendation client 642, process the sensory data, generate one or more instructions and/or recommendations for the vehicle 610 given the current conditions, and transmit the instructions and/or recommendations to the vehicle 610 via the exchange client 644. The assistance program 652 may perform substantially similar operations as described above with regard to the recommendation program 142 and/or the vehicle driving system 110 for image processing and sensory data processing. Therefore, the assistance program 652 may determine how the DAD 630 is to be used (e.g., activation, deactivation, retraction, extension, rotation, etc.) as well as how the vehicle 610 is to be driven (e.g., changing lane, passing another vehicle, changing route, etc.).

As noted above, the exchange client 644 may be configured to receive instructions and/or recommendations from the assistance program 652. Based on the instructions and/or recommendations, the exchange client 644 may determine a destination for the instructions and/or recommendations. For example, if the instructions include deactivating the DAD 630, the exchange client 644 may transmit a notification to the vehicle driving system 620 and a control system of the DAD 630. In another example, if the instructions include a driving instruction and/or recommendation (e.g., lane change, alternative route selection, tracking for a current instant, etc.), the exchange client 644 may transmit the instruction and/or recommendation to the vehicle driving system 620.

Figure 7:
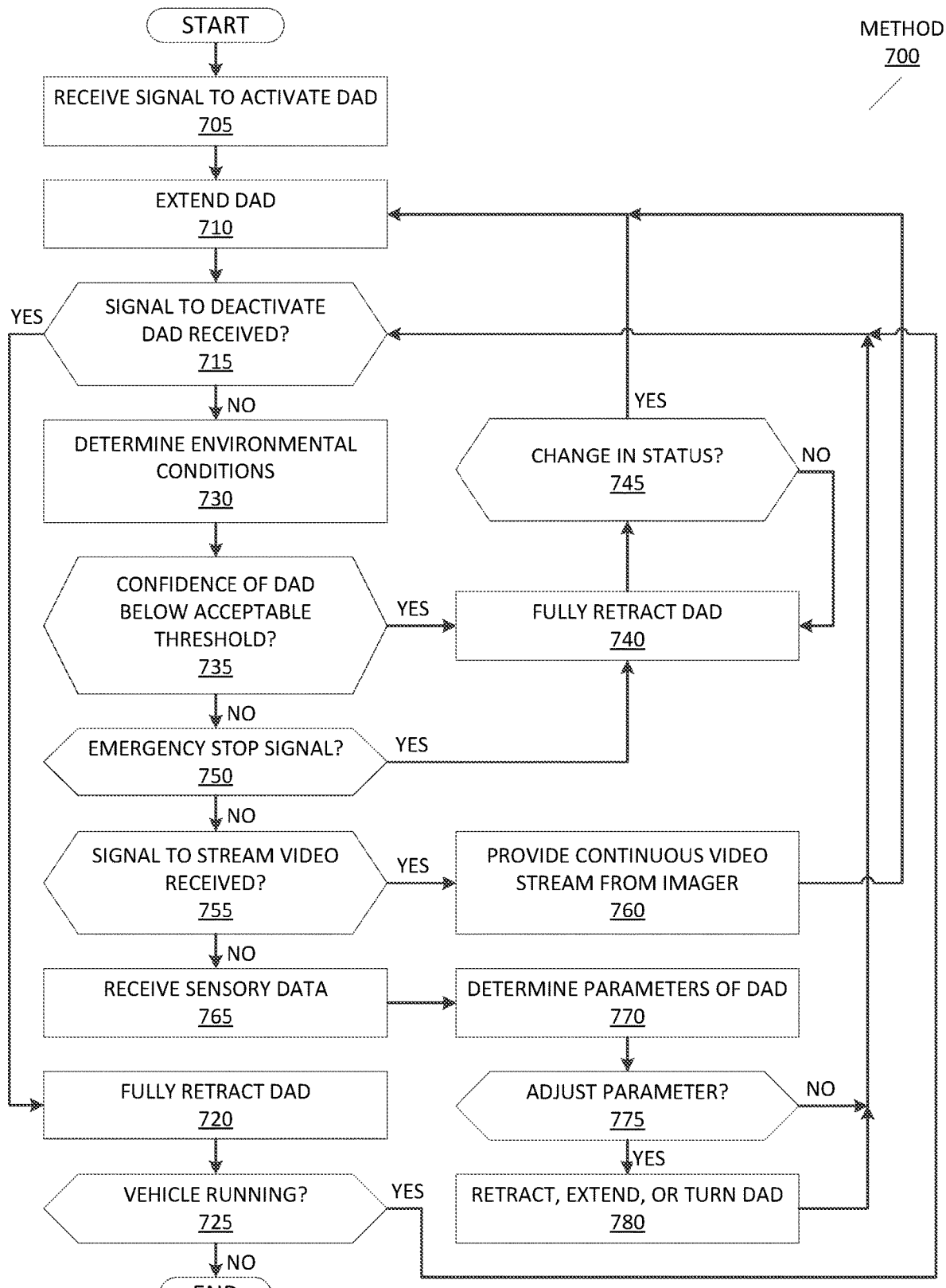
FIG. 7 depicts an exemplary flowchart of a method illustrating the operations of a recommendation program 142 of the driving assistance system 100 in positioning a driving assistance device 112, in accordance with the exemplary embodiments.

FIG. 7 depicts an exemplary flowchart of a method 700 illustrating the operations of the recommendation program 142 of the driving assistance system 100 in positioning the DAD 112, in accordance with the exemplary embodiments. Although the method 700 is described with regard to the implementation illustrated in the driving assistance system 100 of FIG. 1, the method 700 may also be implemented for the driving assistance system 600 of FIG. 6. The driving assistance system 100 according to the exemplary embodiments may also be implemented where the recommendation program 142, the vehicle driving system 110, or a combination thereof is configured to determine a positioning of the DAD 112. For illustrative purposes, the method 700 is described with regard to the recommendation program 142 being responsible for positioning the DAD 112.

The recommendation program 142 may receive a signal to activate the DAD 112 (step 705). The recommendation program 142 may be software that is running on a processing component of the ICB 140. In a preliminary step, the vehicle 105 may be turned on which initiates power to be supplied to the DAD 112. In an exemplary embodiment, the recommendation program 142 may be an initial application that is run upon the DAD 112 including the ICB 140 being initiated. The vehicle 105 may utilize an API call to provide a signal indicating that the vehicle 105 has been turned on. The recommendation program 142 may process the API call resulting in the DAD 112 being activated. In another exemplary embodiment, the DAD 112 may be activated through a different mechanism that does not involve the recommendation program 142. For example, the vehicle driving system 110 may route power to the DAD 112 which triggers the DAD 112 to be activated. The components of the DAD 112 including the imager 150, the motion sensor 160, and the environment sensor 170 may also be activated.

To further illustrate the operations of the risk program 142, reference is now made to an illustrative example. According to the illustrative exemplary embodiment, the vehicle 105 may be a ground vehicle such as a car. The car may be a sedan which has a roof that rides at a relatively lower height than other vehicles that may be on the same road (e.g., SUVs, vans, trucks, etc.). A vehicle 105 may be equipped with a navigation system and an autopilot system. A driver may have turned the car on which activated the DAD 112 installed on the car. The navigation system and the autopilot system may also have been activated. The driver may enter a destination in the navigation system such that the navigation system determines a route to be followed for the vehicle 105 to reach the destination from a current position. As those skilled in the art will understand, the autopilot system may be engaged automatically or manually, especially when certain conditions are present (e.g., the vehicle 105 is on a highway, the vehicle 105 is in traffic, the vehicle 105 is not in a parking lot, etc.).

The recommendation program 142 may extend the DAD 112 to an initial height (step 710). As described above, the DAD 112 may be installed on a top of the vehicle 105. The DAD 112 may also be equipped with a mount 130 that is vertically extendable and retractable from the top of the vehicle 105. As a result of the DAD 112 being activated, the recommendation program 142 may determine an initial height that the DAD 112 is to occupy. In determining the initial height, the recommendation program 142 may determine an initial length that the mount 130 is to extend so that the DAD 112 reaches the initial height. In determining the initial height, the recommendation program 142 may receive sensory data from the imager 150, the motion sensor 160, and/or the environment sensor 170. For example, the motion sensor 160 may indicate if there is an overhead object that may interfere with the DAD 112 reaching a particular height. Based on the sensory data, the recommendation program 142 may determine if an obstacle may obstruct with the DAD 112 being extended and limit the initial height. If there is no obstacle, the recommendation program 142 may utilize a reference height for the DAD 112. The reference height may correspond to a minimum height that the DAD 112 may occupy for the imager 150 to capture images in a field of view for an appropriate or predetermined distance from the vehicle 105. The appropriate distance may be a distance that enables for near future decisions to be determined with regard to a manner of driving the vehicle 105. As a result of determining the initial height of the DAD 112, the mount 130 may extend so that the DAD 112 separates from the seal 210.

With reference again to the previously introduced example, the car may be in a garage of a residence where the garage has a ceiling at a ceiling height and a garage door at a door height that is lower than the ceiling height. The car may be oriented such that the garage door is behind the car. As a result of the driver starting the car and activating the DAD 112, the recommendation program 142 may receive sensory data from the motion sensor 160 that indicates that the car is under a structure having a ceiling height. The recommendation program 142 may receive sensory data from the imager 150 where one or more images show a 360 degree view of surroundings around the car. The images may be processed to show the garage door have a door height. As the car is expected to reverse out of the garage and through the garage door, the recommendation program 142 may determine the door height and limit a height of the DAD 112 to be at most the door height. Thus, an initial height of the DAD 112 through an initial length of the mount 130 may be the door height. When the car has cleared the garage door and the sensory data indicates that the car does not have overhead obstacles, the recommendation program 142 may set the length of the mount 130 to the reference length (assuming the initial length is not the reference length).

The recommendation program 142 may determine whether a signal instructing the DAD 112 to be deactivated has been received (decision 715). There may be a plurality of interrupt API calls that the vehicle driving system 110 may transmit to the recommendation program 142. As a result of the driver turning off the vehicle 105, the vehicle driving system 110 may transmit a signal indicating the updated state of the vehicle that the vehicle 105 has been turned off. As a result of the driver providing a manual input to deactivate the DAD 112, the vehicle driving system 110 may transmit a signal indicating the request from the driver. Thus, when the recommendation program 142 receives a signal instructing the DAD 112 to be deactivated (decision 715, "YES" branch), the recommendation program 142 fully retracts the DAD 112 (step 720). In fully retracting the DAD 112, the DAD 112 may re-engage the seal 210. While in the fully retracted state as a result of receiving the signal to deactivate the DAD 112, the components of the DAD 112 may also be deactivated. The recommendation program 142 may remain activate and determine whether the vehicle 105 is still running (decision 725). For example, if the recommendation program 142 receives a signal that the vehicle 105 has been turned off, the recommendation program 142 may determine that the vehicle 105 is no longer running (decision 725, "NO" branch). The components of the DAD 112 may remain deactivated and the recommendation program 142 may terminate. If the recommendation program 142 receives a signal that the driver manually requested that the DAD 112 be deactivated, the recommendation program 142 may determine whether the vehicle 105 is still running as the driver may have entered the request while driving. The recommendation program 142 may query the vehicle driving system 110 to receive an indication whether the vehicle 105 is still running. If the vehicle is no longer running (decision 725, "NO" branch), the DAD 112 including the recommendation program 142 may deactivate. If the vehicle is still running (decision 725, "YES" branch), the recommendation program 142 may continue to monitor for any signal to deactivate the DAD 112 (decision 715).

Returning to determining whether a signal to deactivate the DAD 112 has been received, if no signal to deactivate the DAD 112 is received (decision 715, "NO" branch), the recommendation program 142 may determine environmental conditions surrounding the vehicle 105 (step 730). The DAD 112 may include the environment sensor 170 that is configured to sense environmental conditions through the access 180. For example, the environment sensor 170 may detect weather conditions, wind conditions, precipitation levels, temperature, etc.

Referring now to the previously introduced, illustrative example, in one scenario, at a subsequent time after leaving the garage, the car may be in an area where the car is driving through an extreme weather condition such as severe rains with high winds. The car may be driving on a highway where the car is driving at a relatively high rate of speed (e.g., at least 55 mph). While driving, the DAD 112 may be extended to the reference length (e.g., when no overhead obstacles are present).

The recommendation program 142 may determine whether the environmental conditions cause a confidence level of safely and effectively using the DAD 112 to be below an acceptable threshold (decision 735). The DAD 112 being positioned at a selected height with the mount 130 extended a selected length, proper and/or safe use of the DAD 112 may rely on a tensile strength to withstand outside forces. When the outside forces exceed the tensile strength (e.g., a structural tensile strength of the extended mount 130), the DAD 112 may be damaged. Other factors may also limit an effectiveness of the DAD 112. For example, severe weather conditions (e.g., high levels of precipitation) may prevent the imager 150 from capturing clear images, particularly at an appropriate distance. The recommendation program 142 may incorporate these various factors associated with environmental conditions to determine a confidence value indicative of using the DAD 112 safely and effectively. As a result of the environmental conditions having a confidence value that is below the acceptable threshold (decision 735, "YES" branch), the recommendation program 142 may instruct the DAD 112 to be fully retracted (step 740).

When the DAD 112 is fully retracted due to environmental conditions being beyond an acceptable threshold, select components of the DAD 112 may remain active or be selectively activated. For example, the environment sensor 170 may remain activated that monitors the environmental conditions. In another example, the DAD 112 or the vehicle 105 may include a sound sensor that receives audio information from the surroundings of the vehicle 105. The sound sensor may remain activated while the DAD 112 is in the retracted position while other sensors of the DAD 112 may be deactivated. Through processing environmental condition information and/or audio information from the environment sensor 170 and/or the sound sensor, respectively, the recommendation program 142 may determine whether there has been a change in status (decision 745). The change in status may be whether the environmental conditions have subsided where the confidence value has risen to be at least the acceptable threshold. The recommendation program 142 may also selectively activate other sensors of the DAD 112 (e.g., the imager 150) to receive sensory data that may verify the change in status. As a result of the environmental conditions remaining static (decision 745, "NO" branch), the recommendation program 142 may continue to keep the DAD 112 fully retracted (step 740). As a result of the environmental conditions changing (e.g., improved from previous experienced extreme conditions) (decision 745, "YES" branch), the recommendation program 142 may extend the DAD 112 in a substantially similar manner as described above (step 710).

With reference again to the illustrative example, under the scenario described above, the environment sensor 170 may sense the extreme weather conditions involving the precipitation, winds, etc. The recommendation program 142 may have also identified the speed of the car (e.g., from the vehicle driving system 110, based on sensory data of the motion sensor 160, etc.). Thus, based on these conditions, the recommendation program 142 may have determined a confidence value of using the DAD 112 to be relatively low (e.g., 0.2 on a scale from 0 to 1). The high winds may place an undue stress on the mount 130, thereby preventing the DAD 112 from being used safely. The high levels of precipitation combined with the relatively fast speed may cause sensory data to be unclear or less valuable, thereby lowering an effectiveness of using the DAD 112. Based on a predetermined acceptable threshold (e.g., 0.7), the confidence value may fall short of the acceptable threshold. Therefore, under this scenario, the recommendation program 142 may fully retract the DAD 112. However, at a subsequent time, the environmental conditions may have subsided for both safety purposes and effectiveness purposes where the confidence value of using the DAD 112 may rise (e.g., 0.9). Therefore, the environmental conditions may have changed in status for the DAD 112 to re-engage. Thus, the DAD 112 may be extended and a substantially similar process of determining a height to set the DAD 112 may be performed.

When the environmental conditions result in a confidence value that is at least the acceptable threshold (decision 735, "NO" branch), the recommendation program 142 may determine whether another type of interrupt API call has been received corresponding to an emergency stop (decision 750). The emergency stop may relate to any condition when the vehicle 105 and/or the driver is experiencing an emergency situation. For example, the vehicle 105 may be experiencing overheating, engine trouble, a flat tire, an unexpected collision (e.g., a circumstance outside human control), etc. In other examples, the vehicle 105 and/or the driver may experience driver fatigue, an autopilot system fault, be under a condition where no manual interruption is available, etc. When an emergency event is registered (e.g., by the vehicle driving system 110), the vehicle driving system 110 may transmit an emergency stop signal to the recommendation program 142. As a result of the emergency stop signal being received (decision 750, "YES" branch), the recommendation program 142 may fully retract the DAD 112 (step 740). The recommendation program 142 may perform further operations when the emergency stop signal is received. For example, the recommendation program 142 may determine a nearest rest area, mechanic, tire center, etc. based on a reason for the emergency stop. In another example, the imager 150 may capture an image of a surrounding area to be stored in a record. In a further example, the recommendation program 142 may receive location information of a current position that the vehicle 105 is located when the emergency stop signal is received (e.g., for emergency services reference). The recommendation program 142 may instruct the navigation system to show a route for the new destination. The recommendation program 142 may determine whether there has been a change in status of the emergency stop (decision 745). As a result of the emergency stop being maintained (decision 745, "NO" branch), the recommendation program 142 may keep the DAD 112 fully retracted. As a result of the emergency stop being reversed or concluded (decision 745, "YES" branch), the recommendation program 142 may extended the DAD 112 (step 710).

As a result of no emergency stop signal being received (decision 750, "NO" branch), the recommendation program 142 may determine whether a signal indicative of a request to stream video has been received (decision 755). In a further type of interrupt API call that may be received, the driver or the vehicle driving system 110 may request that video be streamed. For example, if the vehicle 105 is in a reverse gear, the vehicle driving system 110 may request video to be streamed, specifically for a field of view corresponding to a direction of travel. The vehicle driving system 110 may show the streamed video to a driver who may be backing the vehicle. As a result of receiving the signal indicating a request to stream video (decision 755, "YES" branch), the recommendation program 142 may instruct the imager 150 to capture video (step 760). The recommendation program 142 may forward the captured video to the vehicle driving system 110. The recommendation program 142 may also terminate operations performed by other components of the DAD 112 (e.g., terminate the motion sensor 160, the environment sensor 170, etc.). The recommendation program 142 may determine whether there is a change in status (decision 745). For example, the recommendation program 142 may continuously receive a signal indicative of a request to stream video. While the signal is being received, the video may be streamed. When the signal is not being received, there may be a change in status where video is no longer to be streamed. In another example, the vehicle driving system 110 may generate a stop signal indicating that the video stream is to be stopped. As a result of the video stream being stopped, the recommendation program 142 may resume use of the DAD 112 in the extended state (step 710).

If the recommendation program 142 does not receive an interrupt API call (e.g., deactivate DAD 112 based on input from vehicle 105, input from driver, or environmental conditions, experience an emergency stop situation, or receive a request to stream video), the recommendation program 142 may receive sensory data from the imager 150, the motion sensor 160, and/or the environment sensor 170 to determine further parameters in using the DAD 112 (step 765). The DAD 112 may be extended to a selected height with the mount 130 extending a corresponding length. The sensory data may indicate whether the current parameters of using the DAD 112 is proper. Accordingly, the recommendation program 142 may determine the parameters in using the DAD 112 (step 770). For example, the sensory data may indicate that there are no obstacles in a line of sight or field of view such that the imager 150 may capture images at an appropriate distance. Thus, the recommendation program 142 may determine a range of parameters (e.g., height, angle, etc.) that may be used. In this example, the current parameters may fall within the range of determined parameters. In another example, the sensory data may indicate that there is an obstacle ahead of the vehicle 105 (e.g., a truck that obscures the imager 150 from capturing images at the appropriate distance). Thus, the recommendation program 142 may determine a range of parameters that may be used to overcome the obstacle. In this example, one or more of the current parameters may fall outside the range of determined parameters (e.g., height is too short). The recommendation program 142 may determine whether a parameter is to be adjusted (decision 775). As a result of the current parameters falling within the range of determined parameters (decision 775, "NO" branch), the recommendation program 142 may continue using the DAD 112 under the current setting. As a result of the current parameter falling outside the range of determined parameters (decision 775, "YES" branch), the recommendation program 142 may determine the manner in which to adjust the positioning and/or angular orientation of the DAD 112 and execute the adjustment (step 780). The DAD 112 may then be used under a new setting.

Returning to the previously introduced example, the car may be driving behind a SUV that rides higher than the height of the DAD 112 and subsequently the imager 150. Therefore, the images captured by the imager 150 may be at least partially obscured by the SUV such that the images do not capture objects or scenes at the appropriate distance. The imager 150 may continue to capture images under these conditions. The recommendation program 142 may process the images to determine a relative height of the SUV based on a distance that the car is traveling behind the SUV. The recommendation program 142 may consider the imaging parameters of the imager 150 (e.g., wide-angled lens capability) to determine a height that the DAD 112 is to be set for the imager 150 to again capture images of the appropriate distance without being obscured by the SUV. The recommendation program 142 may instruct the DAD 112 to further extend to an increased height. At a subsequent time when the SUV no longer obscures the imager 150, the recommendation program 142 may instruct the DAD 112 to return to the reference height.

The recommendation program 142 may utilize the operations of the method 700 iteratively while the vehicle 105 is running so that the DAD 112 is dynamically positioned and angularly oriented for the imager 150 to properly capture meaningful images worth processing.

Figure 8:
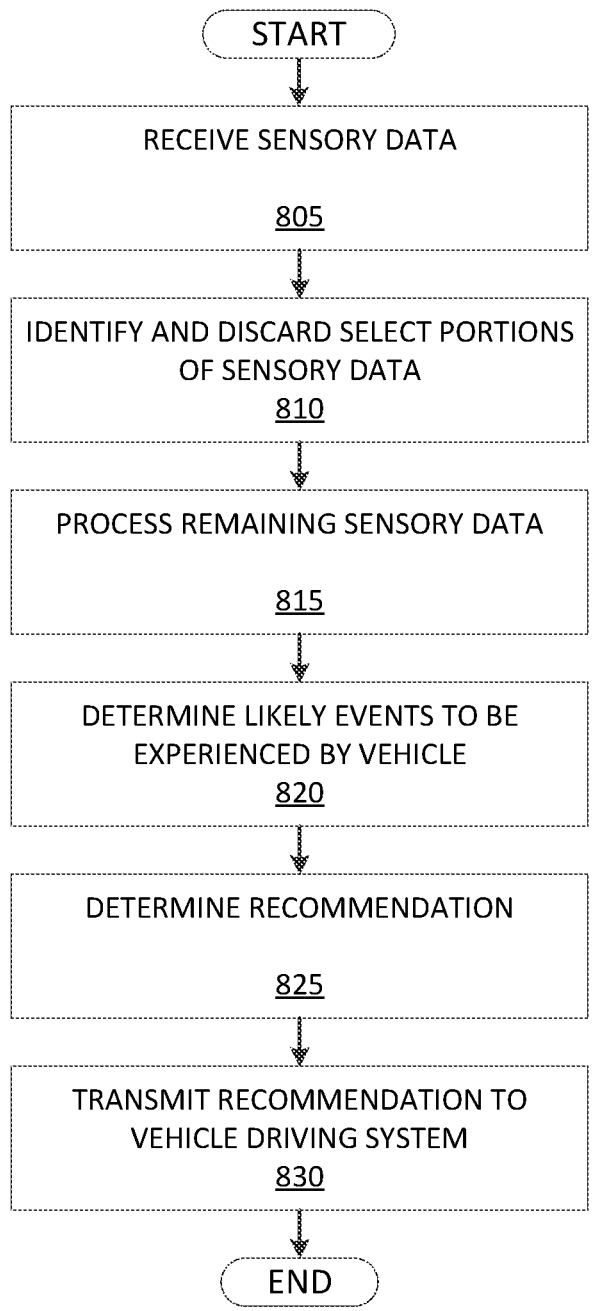
FIG. 8 depicts an exemplary flowchart of a method illustrating the operations of a recommendation program 142 of the driving assistance system 100 in processing sensory data, in accordance with the exemplary embodiments.

FIG. 8 depicts an exemplary flowchart of a method 800 illustrating the operations of the recommendation program 142 of the driving assistance system 100 in processing sensory data, in accordance with the exemplary embodiments. Although the method 800 is described with regard to the implementation illustrated in the driving assistance system 100 of FIG. 1, the method 800 may also be implemented for the driving assistance system 600 of FIG. 6. The driving assistance system 100 according to the exemplary embodiments may also be implemented where the recommendation program 142, the vehicle driving system 110, or a combination thereof is configured to process the sensory data. For illustrative purposes, the method 800 is described with regard to the recommendation program 142 being responsible for processing the sensory data.

The recommendation program 142 may receive sensory data from the imager 150, the motion sensor 160, and/or the environment sensor 170 (step 805). The DAD 112 may be at a selected position and angular orientation. As a result of the DAD 112 being activated, the DAD 112 may be raised via the mount 130 to a selected height. The DAD 112 may also be positioned according to a reference height that reflects a minimum height that the DAD 112 is to be positioned for the imager 150 to capture images of objects or a scene at an appropriate distance. The motion sensor 160 may provide motion data of objects near the vehicle 105 as well as detecting a presence of overhead objects. The environment sensor 170 may provide information regarding environmental conditions of the surroundings of the vehicle 105.

To further illustrate the operations of the recommendation program 142, reference is now made to an illustrative example. According to the illustrative exemplary embodiment, the vehicle 105 may be a car that is equipped with an autopilot system controlled by the vehicle driving system 110. The recommendation program 142 may be configured to transmit instructions and/or recommendations to the vehicle driving system 110 that may implement the instructions and/or recommendations in the autopilot system. In this illustrative exemplary embodiment, the car may be driving down a highway where a section of the highway ahead of where a current position of the car has a traffic jam due to an accident.

The recommendation program 142 may identify and discard select portions of the sensory data (step 810). The recommendation program 142 may continuously receive sensory data from the imager 150, the motion sensor 160, and/or the environment sensor 170. The continuous stream of sensory data may result in portions of the sensory data to be redundant, of little or no significance, unclear, etc. To increase an efficiency with which subsequent operations are performed, the recommendation program 142 may be configured to identify portions of the sensory data that may be omitted from subsequent operations.

With reference again to the previously introduced example, the imager 150 may capture images at a given rate. For example, the rate may be a continuous rate that is substantially similar to video. In another example, the rate may be at predetermined or dynamic intervals. The recommendation program 142 may receive the images from the imager 150. The recommendation program 142 may perform a preliminary processing of the images to identify which of the images provide a relatively low amount of information. For example, when traffic conditions remain relatively static, when objects in the surroundings of the car remain relatively unchanged, etc., consecutive images that are captured by the imager 150 may provide redundant information. Thus, the recommendation program 142 may select images that provide less than a predetermined amount of new information for omission from subsequent processing.

The recommendation program 142 may process the remaining sensory data (step 815). The recommendation program 142 may perform more significant processing operations of the sensory data that is to be used. For example, the recommendation program 142 may perform image processing of images captured by the imager 150 to determine location of objects, distances of objects to the car, identification of events or traffic conditions lying ahead of the car, etc. In another example, the recommendation program 142 may perform motion analyses based on the information provided by the motion sensor 160. In this manner, the recommendation program 142 may determine likely events that may be experienced by the vehicle 105 (step 820).

Referring now to the previously introduced, illustrative example, the imager 150 may capture images at an appropriate distance. The recommendation program 142 may process the images to determine that there is the traffic jam that lies ahead on the route of the car. The recommendation program 142 may also have access to map data and/or use the images captured by the imager 150 to determine an exit ramp that lies between the car and the traffic jam that may be used for an alternative route. While driving toward the traffic jam, the motion sensor 160 may capture motion information of another vehicle that may be approaching the car from a rear at a speed indicative of a rear end collision.

The recommendation program 142 may determine a recommendation and/or instruction on how to proceed with driving the vehicle 105 (step 825). Based on the likely events that may be experienced by the vehicle 105, the recommendation program 142 may determine an appropriate course of action that may be taken to improve a driving experience and/or safety. With optimization goals related to timely arrival to a destination, safety concerns, etc., the recommendation program 142 may determine actions that abide by these optimization goals. The recommendation program 142 may transmit the recommendations and/or instructions to the vehicle driving system 110 for further processing or implementation (step 830).

With reference again to the illustrative example, the recommendation program 142 may generate a recommendation for an alternative route to be taken to avoid a delay linked to staying on a current route due to the traffic jam. The recommendation program 142 may transmit the recommendation to the vehicle driving system 110 for the alternative route or that an exit ramp is available to avoid the traffic jam caused by the accident. The vehicle driving system 110 may implement the recommendation or feed the information to the navigation system that determines an alternative route that incorporates the exit ramp. The recommendation program 142 may also generate a recommendation to immediately change lanes or speed up to avoid a potential collision with the further vehicle that is approaching the car from the rear at a dangerous rate. The recommendation program 142 may transmit the recommendation to the vehicle driving system 110 for an instant micro-control to be used to prevent a rear end collision determined to be likely. The determination of the possible collision may also trigger the imager 150 to rotate towards the oncoming vehicle and capture images or video that is stored for a record should an accident occur. The recommendation program 142 may also detect when a lane, a shoulder, a right/left turn only lane, etc. is ending so that the recommendation program 142 determines and transmits a proper action to the vehicle driving system 110.

The exemplary embodiments are configured to provide a driving assistance device utilizing an imager that is vertically extendable and retractable from a top of a ground vehicle. The retractable feature of the imager may allow image to be captured at an appropriate distance from the vehicle for instant and/or near future decisions to be determined. The retractable feature of the imager may position the imager at a plurality of different heights so that obstacles that may obstruct a line of sight or field of view of the imager may be overcome. An embodiment in which the imager has a wide-angled lens provides the advantage of requiring less angular orientations and less images to be captured. For the various purposes for which the exemplary embodiments may be used, the exemplary embodiments further provide a mechanism by which to control how the driving assistance device is used through a determination of when to use the driving assistance device as well as positioning and angular orientation of the driving assistance device based on the conditions being experienced by the vehicle and the driving assistance device. The exemplary embodiments further provide a mechanism by which sensory data is processed to determine instructions and/or recommendations that affect how the vehicle is driven.

Figure 9:
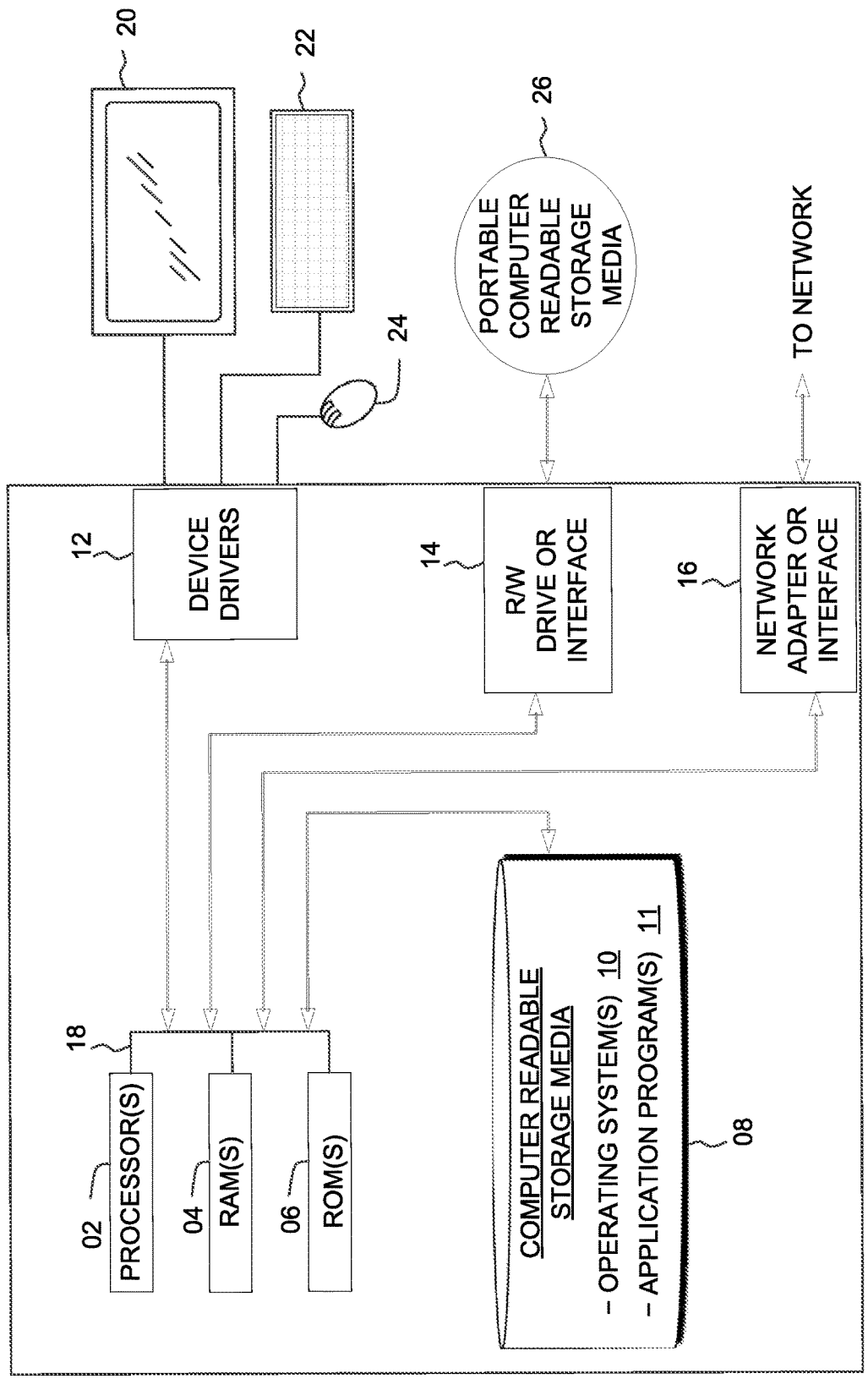
FIG. 9 depicts an exemplary block diagram depicting the hardware components of the driving assistance system 100 of FIG. 1, in accordance with the exemplary embodiments.

FIG. 9 depicts a block diagram of devices within the driving assistance system 100 of FIG. 1, in accordance with the exemplary embodiments. It should be appreciated that FIG. 9 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
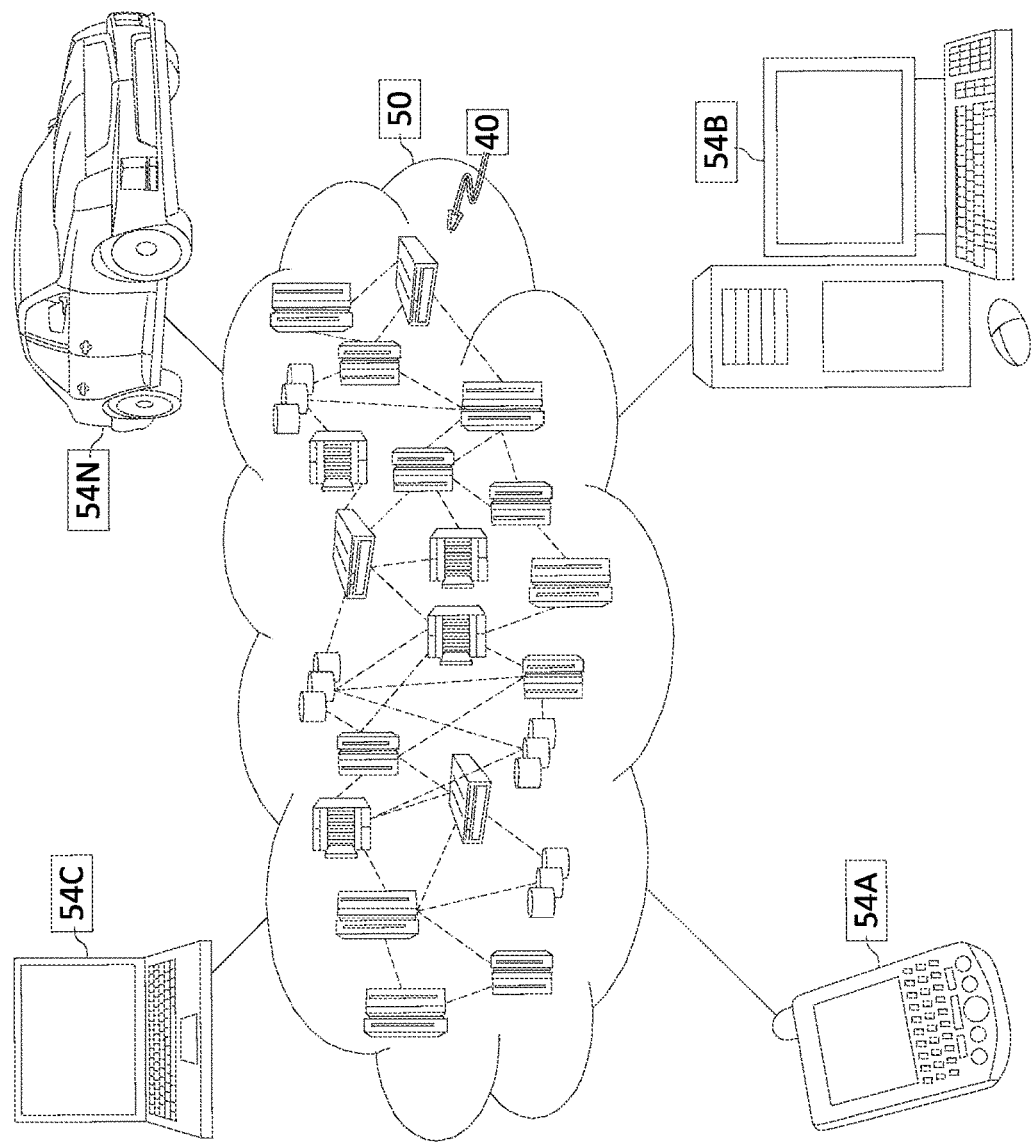
FIG. 10 depicts a cloud computing environment, in accordance with the exemplary embodiments.

Referring now to FIG. 10, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 40 and cloud computing environment 50 can communicate with any type of computerized device over any type of network and/or network addressable connection (e.g., using a web browser).

Figure 11:
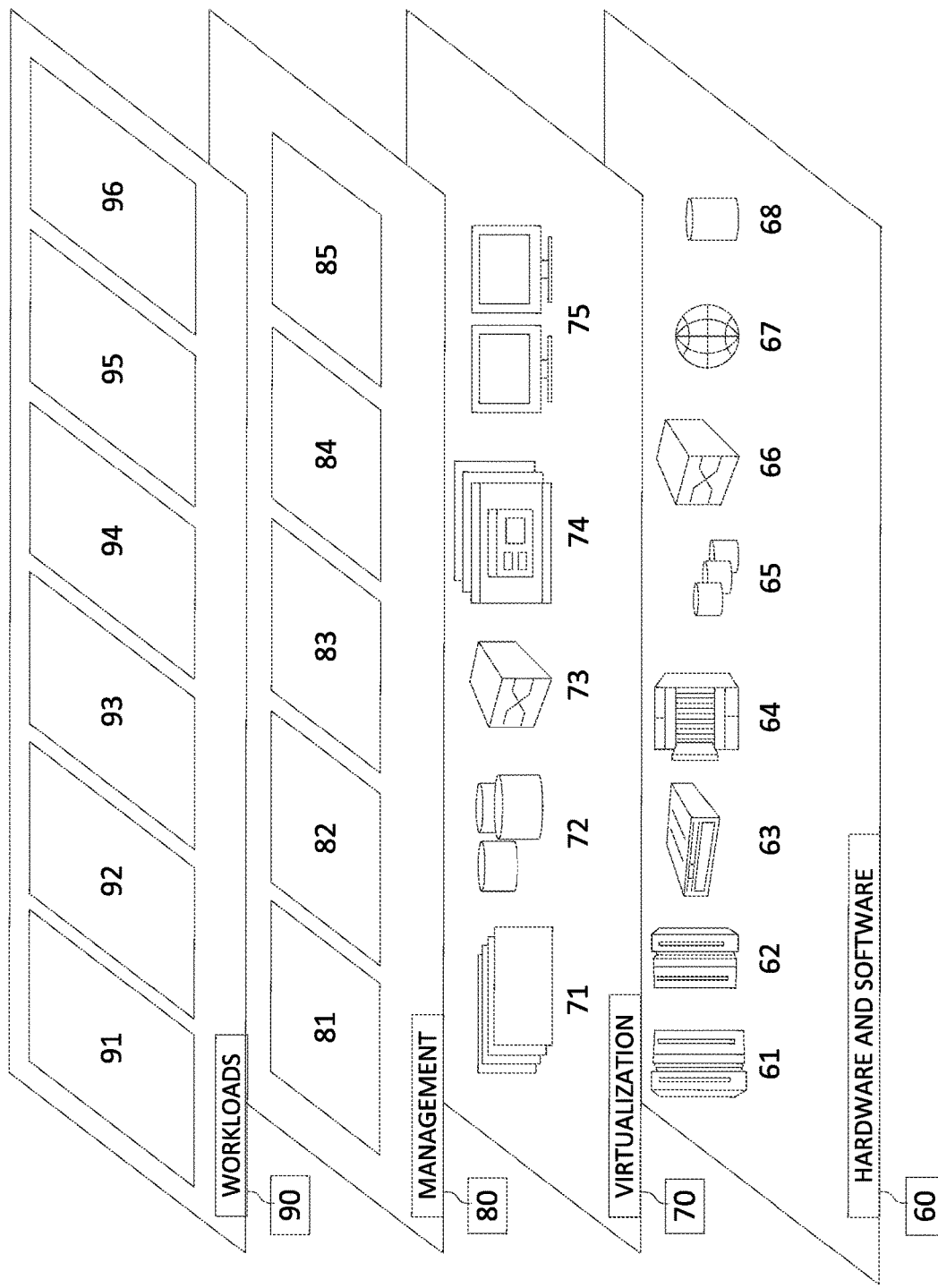
FIG. 11 depicts abstraction model layers, in accordance with the exemplary embodiments.

Referring now to FIG. 11, a set of functional abstraction layers provided by cloud computing environment 50 (FIG. 10) is shown. It should be understood in advance that the components, layers, and functions shown in FIG. 11 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vision assisted driving processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A driving assistance device for vision assisted vehicle driving, the device comprising:
   an imager vertically extendable from a surface of a vehicle from a retracted position to an extended position, the imager configured to capture images from a predetermined height above the vehicle while the imager is in the extended position, the images capturing a field of view including a predetermined distance from the vehicle;
   a mount coupled to the imager and having an extendable length to position the imager in the retracted position and the extended position;
   an environment sensor configured to determine environmental conditions data in surroundings around the vehicle;
   a sound sensor configured to receive environmental sound data in the surroundings around the vehicle; and
   a processor configured to process the images to determine a recommendation for driving the vehicle based on driving conditions present at the predetermined distance based on the images, the processor configured to determine to retract the imager to the retracted position as a result of the environmental conditions data being indicative of extreme weather conditions being experienced by the vehicle, the extreme weather conditions being determined to affect an image quality for the images being captured by the imager, the processor further configured to process the environmental sound data while the imager is retracted due to the environmental conditions data, the processor configured to activate the imager as a result of the environmental sound data being indicative of a change to the extreme weather conditions.

2. The device of claim 1, further comprising:
   a control channel communicatively connecting the processor to a vehicle driving system of the vehicle, the vehicle driving system incorporating the recommendation to control a movement of the vehicle.

3. The device of claim 1, wherein the processor is further configured to determine the predetermined height that the imager is to occupy based on the images.

4. The device of claim 1, further comprising:
   a motion sensor configured to determine overhead distance data associated with an overhead object that is one of presently over the vehicle or determined to be along a path of the vehicle,
   wherein the processor is further configured to determine the predetermined height that the imager is to occupy based on the overhead distance data.

5. The device of claim 4, wherein the motion sensor is further configured to determine motion data associated with an object approaching the vehicle, and wherein the processor is further configured to determine an angular orientation that the imager is to occupy based on the motion data.

6. The device of claim 1, wherein the processor is further configured to determine whether to one of extend or retract the imager to the extended position based on the environmental conditions data.

7. The device of claim 1, further comprising:
   a seal configured to seal the surface of the vehicle while the imager is in the retracted position and the extended position.

8. A processing device for vision assisted vehicle driving, the processing device comprising:
   one or more computer processors, one or more computer-readable storage media, and program instructions stored on the one or more of the computer-readable storage media for execution by at least one of the one or more processors capable of performing the operations of:
   setting an extendable length of a mount;
   receiving images from an imager vertically extendable from a surface of a vehicle from a retracted position to an extended position, the imager being coupled to the mount such that the mount is in the extended position while the mount is at the set extendable length, the images being captured from a predetermined height above the vehicle while the imager is in the extended position, the images capturing a field of view including a predetermined distance from the vehicle;

determining environmental conditions data in surroundings around the vehicle;

processing the images;

determining a recommendation for driving the vehicle based on driving conditions present at the predetermined distance based on the images;

determining to retract the imager to the retracted position as a result of the environmental conditions data being indicative of extreme weather conditions being experienced by the vehicle, the extreme weather conditions being determined to affect an image quality for the images being captured by the imager;

determining environmental sound data in the surroundings around the vehicle while the imager is retracted due to the environmental conditions data; and as a result of the environmental sound data being indicative of a change to the extreme weather conditions, activating the imager.

9. The processing device of claim 8, wherein the operations further comprise:

transmitting the recommendation to a vehicle driving system of the vehicle via a control channel communicatively connecting the one or more processors and the vehicle driving system.

10. The processing device of claim 8, wherein the operations further comprise:

determining the predetermined height that the imager is to occupy based on the images.

11. The processing device of claim 10, wherein the images indicate an object obstructing a line of sight of the imager preventing the field of view of the images to include the predetermined distance.

12. The processing device of claim 8, wherein the operations further comprise:

determining overhead distance data associated with an overhead object that is one of presently over the vehicle or determined to be along a path of the vehicle; and determining the predetermined height that the imager is to occupy based on the overhead distance data.

13. The processing device of claim 12, wherein the operations further comprise:

determining motion data associated with an object approaching the vehicle; and determining an angular orientation that the imager is to occupy based on the motion data.

14. The processing device of claim 8, wherein the operations further comprise:

determining whether to one of extend or retract the imager to the extended position based on the environmental conditions data.

15. A computer-implemented method for vision assisted vehicle driving, the method comprising:

setting an extendable length of a mount;

receiving images from an imager vertically extendable from a surface of a vehicle from a retracted position to an extended position, the imager being coupled to the mount such that the mount is in the extended position while the mount is at the set extendable length, the images being captured from a predetermined height above the vehicle while the imager is in the extended position, the images capturing a field of view including a predetermined distance from the vehicle;

determining environmental conditions data in surroundings around the vehicle;

processing the images;

determining a recommendation for driving the vehicle based on driving conditions present at the predetermined distance based on the images;

determining to retract the imager to the retracted position as a result of the environmental conditions data being indicative of extreme weather conditions being experienced by the vehicle, the extreme weather conditions being determined to affect an image quality for the images being captured by the imager;

determining environmental sound data in the surroundings around the vehicle while the imager is retracted due to the environmental conditions data; and as a result of the environmental sound data being indicative of a change to the extreme weather conditions, activating the imager.

16. The computer-implemented method of claim 15, further comprising:

transmitting the recommendation to a vehicle driving system of the vehicle via a control channel communicatively connecting a processor configured to determine the recommendation and the vehicle driving system.

17. The computer-implemented method of claim 15, further comprising:

determining the predetermined height that the imager is to occupy based on the images, wherein the images indicate an object obstructing a line of sight of the imager preventing the field of view of the images to include the predetermined distance.

18. The computer-implemented method of claim 15, further comprising:

determining overhead distance data associated with an overhead object that is one of presently over the vehicle or determined to be along a path of the vehicle; and determining the predetermined height that the imager is to occupy based on the overhead distance data.

19. The computer-implemented method of claim 18, further comprising:

determining motion data associated with an object approaching the vehicle; and determining an angular orientation that the imager is to occupy based on the motion data.

20. The computer-implemented method of claim 15, further comprising:

determining whether to one of extend or retract the imager to the extended position based on the environmental conditions data.

* * * * *